(12) United States Patent
Moutafis et al.

(10) Patent No.: US 10,235,344 B2
(45) Date of Patent: Mar. 19, 2019

(54) RANK-BASED SCORE NORMALIZATION FRAMEWORK AND METHODS FOR IMPLEMENTING SAME

(71) Applicant: The University of Houston System, Houston, TX (US)

(72) Inventors: Panagiotis Moutafis, Houston, TX (US); Ioannis A. Kakadiaris, Houston, TX (US)

(73) Assignee: THE UNIVERSITY OF HOUSTON SYSTEM, Houston, TX (US)

( * ) Notice: Subject to any disclaimer, the term of this patent is extended or adjusted under 35 U.S.C. 154(b) by 834 days.

(21) Appl. No.: 14/216,305

(22) Filed: Mar. 17, 2014

(65) Prior Publication Data

US 2014/0324391 A1   Oct. 30, 2014

Related U.S. Application Data

(60) Provisional application No. 61/790,965, filed on Mar. 15, 2013, provisional application No. 61/858,192, filed on Jul. 25, 2013.

(51) Int. Cl.
*G06F 17/17* (2006.01)
*G06K 9/00* (2006.01)
*G06K 9/62* (2006.01)

(52) U.S. Cl.
CPC ........ *G06F 17/17* (2013.01); *G06K 9/00214* (2013.01); *G06K 9/00288* (2013.01); *G06K 9/6226* (2013.01)

(58) Field of Classification Search
CPC ........ G06F 17/17; G06F 17/175; G06F 17/18; G06K 9/00214; G06K 9/00221; G06K 9/00268; G06K 9/00288; G06K 9/00295; G06K 9/00302; G06K 9/00328; G06K 9/6226; G06K 9/6228; G06K 9/623; G06K 9/6231–9/6232; G06K 9/6288; G06K 9/629; G06K 9/6298
See application file for complete search history.

(56) References Cited

U.S. PATENT DOCUMENTS

| | | |
|---|---|---|
| 2010/0312763 A1 | 12/2010 | Peirce |
| 2012/0078886 A1 | 3/2012 | Dinerstein et al. |
| 2012/0215771 A1 | 8/2012 | Steiner |

OTHER PUBLICATIONS

Merati et al., User-Specific Cohort Selection and Score Normalization for Biometric Systems, Aug. 2012, IEEE Transactions on Information Forensics and Security, vol. 7, No. 4, pp. 1270-1277.*
Abaza et al., Quality Based Rank-Level Fusion in Multibiometric Systems, Sep. 2009, 3rd IEEE International Conference on Biometric: Theory, Applications, and Systems (BTAS '09), pp. 1-6.*

(Continued)

*Primary Examiner* — Toan Le

(57) ABSTRACT

A rank-based score normalization framework that partitions matching scores into subsets and normalize each subset independently. Methods include implementing two versions of the framework: (i) using gallery-based information (i.e., gallery versus galleryscores), and (ii) updating available information in an online fashion. The methods improve the detection and identification rate from 20:90% up to 35:77% for Z-score and from 25:47% up to 30:29% for W-score.

10 Claims, 21 Drawing Sheets

(56) References Cited

OTHER PUBLICATIONS

Jain et al., Score Normalization in Multimodal Biometric Systems, 2005, Pattern Recognition, vol. 38, No. 12, pp. 2270-2285.*
Abaza et al., Quality Based Rank-Level Fusion in Multibiometric Systems, 2009 IEEE, 6 pp.*
Poh et al., A Methodology for Separating Sheep from Goats for Controlled Enrollment and Multimodal Fusion, 2008 IEEE, 6 pp.*
Poh et al., A Unified Framework for Biometric Expert Fusion Incorporating Quality Measures, Jan. 2012, IEEE Transactions on Pattern Analysis and Machine Intelligence, vol. 34, No. 1, pp. 3-18.*
PCT ISR and Written Opinion dated Aug. 29, 2014.
PCT IPER dated Sep. 24, 2015.
Abaza. Ayman et al. "Quality based rank-level fusion in multibiometric systems," In: 3rd IEEE International Conference on Biometrics: Theory, Applications, and Systems (BTAS'09), pp. 1-6, Sep. 2009 See abstract and section I I.
Jain, Anil et al. "Score normalization in mu! t imodal biometric systems," Pattern Recognition, vol. 38, No. 12, pp. 2270-2285. 2005 See section 3.
PCT ISR and Written Opinion dated Aug. 29, 2014, 11 pp.

* cited by examiner

RBSN: Partition the scores for a given probe in a rank-based manner and normalize each resulting subset independently.

| Biometric Samples | Probe | Rank |
|---|---|---|
| $X_1$ | $S_{X1}=0.7$ | 2 |
| $X_2$ | $S_{X2}=0.8$ | 1 |
| $X_3$ | $S_{X3}=0.6$ | 3 |
| $Y_1$ | $S_{Y1}=0.4$ | 1 |
| $Y_2$ | $S_{Y2}=0.3$ | 2 |
| $Z_1$ | $S_{Z1}=0.2$ | 2 |
| $Z_2$ | $S_{Z2}=0.1$ | 3 |
| $Z_3$ | $S_{Z3}=0.7$ | 1 |

(Gallery)

1. Compute similarity scores: $S_{Wi}$
2. Compute the ranks for each gallery
3. Create the rank-based subsets:
   $C_r = \{r^{th} \text{ ranked scores}\}$
4. Normalize each subset $C_r$ independently $C_1 = \{S_{X2}, S_{Y1}, S_{Z3}\} = \{0.8, 0.4, 0.7\}$
$C_2 = \{S_{X1}, S_{Y2}, S_{Z1}\} = \{0.7, 0.3, 0.2\}$
$C_3 = \{S_{X3}, S_{Z2}\} = \{0.6, 0.1\}$

GRBSN: Exploit gallery-based information to normalize scores using two sources of information.

1. Normalize each row using RBSN   2. Normalize column using RBSN

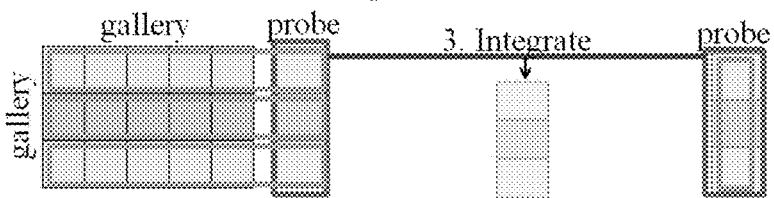

3. Integrate

ORBSN: Update the information used for score normalization in an *online* fashion, when more than one probes are available.

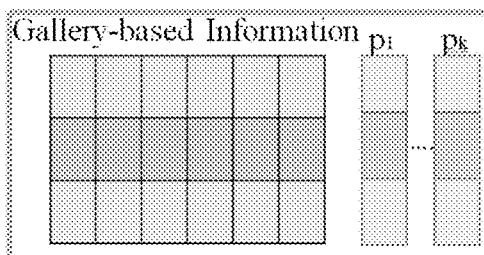

Gallery-based Information  $p_i$  $p_k$

1. Each time a probe is found to be part of the gallery, use its biometric sample to augment the external information.
2. Apply GRBNS to new probes, by using the augmented external information.

FIG. 1A

RBSN: Partition the scores for a given probe and normalize each resulting subset independently.

| Biometric Samples | | Probe | Rank |
|---|---|---|---|
| Gallery | X₁ | $S_{X1}$=0.7 | 2 |
| | X₂ | $S_{X2}$=0.8 | 1 |
| | X₃ | $S_{X3}$=0.6 | 3 |
| | Y₁ | $S_{Y1}$=0.4 | 1 |
| | Y₂ | $S_{Y2}$=0.3 | 2 |
| | Z₁ | $S_{Z1}$=0.2 | 2 |
| | Z₂ | $S_{Z2}$=0.1 | 3 |
| | Z₃ | $S_{Z3}$=0.7 | 1 |

1. Compute the rank of the scores for each gallery subject.
2. Create the rank-based subsets: $C_r$={$r^{th}$ ranked scores}.
3. Normalize each subset independently.

$C_1 = \{S_{X2}, S_{Y1}, S_{Z3}\} = \{0.8, 0.4, 0.7\}$
$C_2 = \{S_{X1}, S_{Y2}, S_{Z1}\} = \{0.7, 0.3, 0.2\}$
$C_3 = \{S_{X3}, S_{Z2}\} = \{0.6, 0.1\}$

GRBSN: Exploit gallery-based information to normalize scores using two sources of information.

1. Normalize column using RBSN.
2. If confident concerning the estimated identity normalize each row using RBSN.
3. Combine

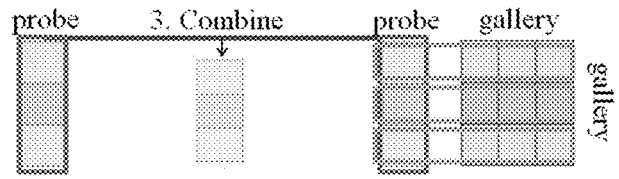

ORBSN: Update the information used for score normalization in an *online* fashion when more than one probes are available.

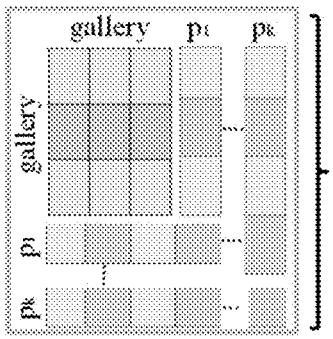

1. Each time a probe is found to be part of the gallery use its biometric sample to augment the gallery set.
2. Re-compute the gallery versus gallery similarity scores.
3. Apply GRBSN for new probes using the enhanced gallery information.

FIG. 7

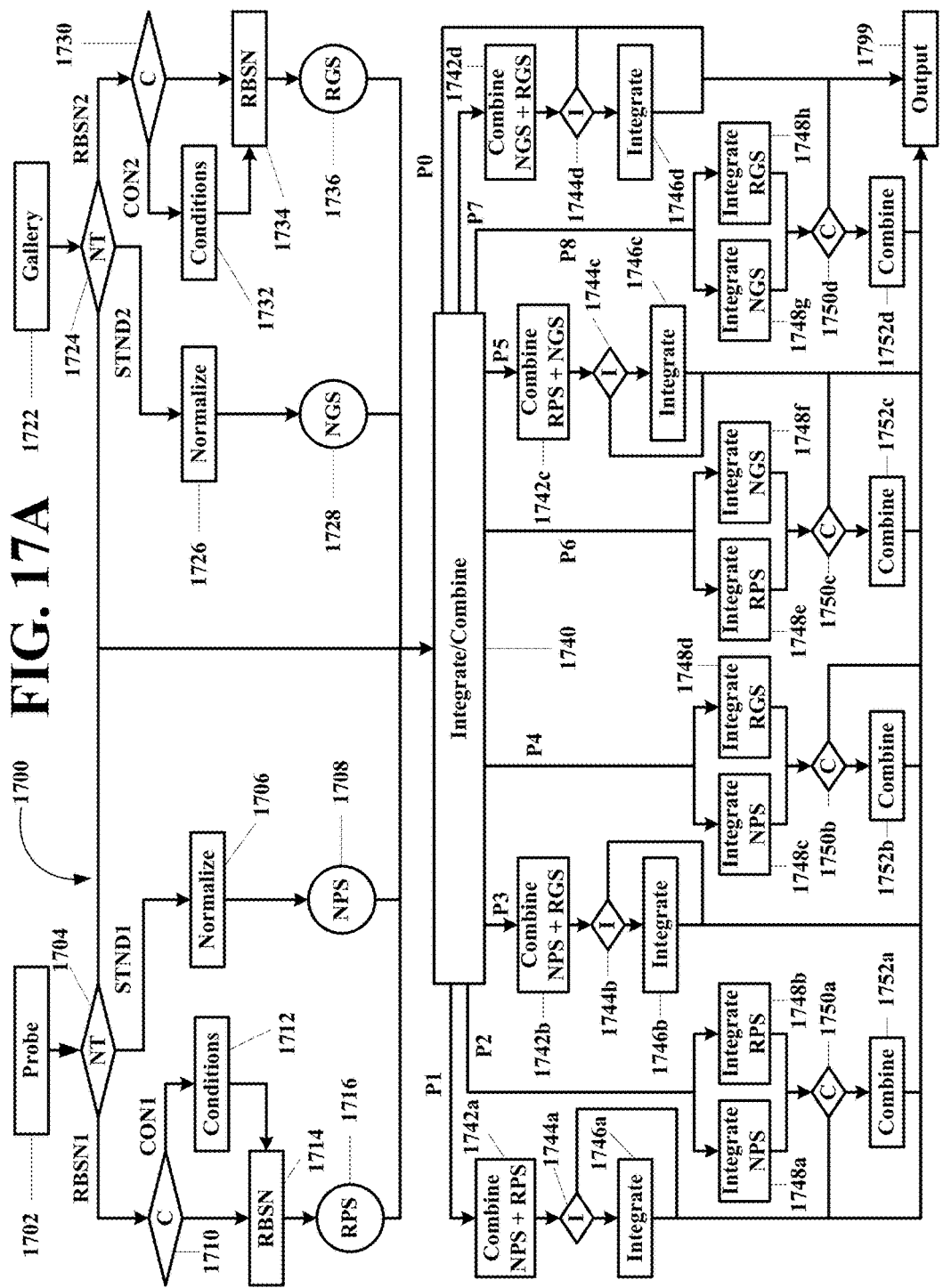

RANK-BASED SCORE NORMALIZATION FRAMEWORK AND METHODS FOR IMPLEMENTING SAME

RELATED APPLICATIONS

This application claims priority to and the benefit of U.S. Provisional Patent Application Ser. No. 61/790,965, filed Mar. 15, 2013 (15 Mar. 2013) and 61/858,192 filed Jul. 25, 2013 (25 Jul. 2013).

BACKGROUND OF THE INVENTION

1. Field of the Invention

Embodiments of this invention relate to a rank-based score normalization framework that partitions matching scores into subsets and normalizes each subset independently. Embodiments of the methods include implementing two versions of a framework: (i) using gallery-based information (i.e., gallery versus galleryscores), and (ii) updating available information in an online fashion. The methods improve the detection and identification rate from 20:90% up to 35:77% for Z-score and from 25:47% up to 30:29% for W-score.

2. Description of the Related Art

The Open-set Identification task for unimodal systems are two step process: (i) determine whether a probe is part of the gallery, and if it is (ii) return the corresponding identity. The most common approach is to select the maximum matching score for a given probe and compare it against a given threshold. In other words, we match a probe against the gallery sample that appears to be the most similar to it. As a result, the Open-set Identification problem may be considered to be a hard Verification problem. A more detailed discussion about this point of view may be found in Fortuna et al.[6]. This is not the only reason why the Open-set Identification task is a hard problem. Each time that a subject submits its biometric sample to the system, there are a number of variations that may occur. For example, differences in pose, illumination and other conditions during data acquisition may occur. Consequently, each time that a different probe is compared against the gallery the matching scores obtained follow a different distribution. One of the most efficient ways to address this problem is score normalization. Such techniques map scores to a common domain where they are directly comparable. As a result, a global threshold may be found and adjusted to the desired value. Score normalization techniques are also very useful when combining scores in multimodal systems. Specifically, different classifiers from different modalities produce heterogeneous scores. Normalizing these scores before combining them is thus crucial for the performance of the system[9].

Thus, there is a need in the art for new normalization systems that exploit the available information more effectively.

SUMMARY OF THE INVENTION

Embodiments of this invention provide systems different ways to normalize scores. The first embodiment of the system partitions matching scores into subsets and normalizes each subset individually. The second embodiment uses gallery-based information (i.e., gallery versus gallery scores). The third embodiment updates available information in an online fashion. The theory of Stochastic Dominance illustrates that the frameworks of this invention may increase the system's performance. Some important advantages of this invention include: (i) the first two embodiments do not require tuning of any parameters, (ii) the systems may be used in conjunction with any score normalization technique and any integration rule, and (iii) the systems extends the use of W-score normalization in multi-sample galleries. The present invention is applicable to any problem that may be formulated as an Open-set Identification task or a Verification task. In a multimodal system with single-sample galleries, a set of scores is obtained from each modality. Each such set includes of a single sample per gallery subject, and since they are obtained by different classifiers, they are heterogeneous. In order to increase the system's performance, a score normalization step that maps the scores into a common domain is needed before they are combined. An aspect of this invention extends this methodology to unimodal systems within multi-sample galleries. The scores for the subsets were generated by unimodal systems, while the subsets themselves were obtained from our methodology as shown in FIGS. 1A&B and FIG. 2 and they include by construction at most one sample per gallery subject, and are also ordered (by invocation to the Stochastic Dominance Theory). Using exactly the same arguments made in previous works for the multimodal case, it is clear that our invention (see FIG. 5) yields increased performance. Even though this application is not focusing on multimodal systems, the results presented may be very useful in understanding the intuition behind the present approach.

Moreover, the gallery-based information may be used to normalize scores in a Gallery-specific manner (see FIGS. 3-4). The obtained scores may then be combined with the Probe-specific normalized scores, as combination rules are applicable anytime evidence from multiple measurements is available. In a similar way, the gallery-based information may be enhanced in an online fashion (see FIGS. 3-4) by: (i) adding the corresponding similarities score to the gallery versus gallery similarity matrix, and/or (ii) augmenting the gallery set. Since not all probes are suitable for this, a decision has to be reached each time based on whether the system is confident about the estimated identity and the new probe adds important information.

This invention is suitable for any problem/application that may be formulated as an Open-set Identification task or Verification task. Although the framework of this invention was designed to improve the performance of the current score normalization techniques, the framework will also work equally well with such techniques yet to be invented. In addition, in score normalization for multimodal biometric systems, it is assumed that scores are heterogeneous only between each modality. This invention shows that something like this is not true. Therefore, the invention may be adapted to the case of multimodal systems. Specifically, the scores produced by different modalities may be concatenated, as if they were produced by a unimodal system with multiple samples per gallery. In certain embodiment, a scaling or pre-processing step may be applied prior to concatenation. Then, the invention may be applied as usual. In summary, any application or problem that computes similarity scores (or distances) may be benefitted by this invention.

Biometric systems make use of score normalization techniques and fusion rules to improve the recognition performance. The large amount of research on multimodal systems raises an important question: can we extract additional information from unimodal systems? In this application, we present a rank-based score normalization framework that addresses this problem. Specifically, our approach consists of three computer procedure or algorithm that: (i) partition the matching scores into subsets and normalize each subset independently when multiple samples per subject are available, (ii) exploit gallery-based information (i.e., gallery versus gallery scores), and (iii) augment the gallery in an online fashion. We invoke the Stochastic Dominance theory along with results of prior research to demonstrate that our approach can yield increased performance. Our framework: (i) can be used in conjunction with any score normalization technique and any fusion rule, (ii) is suitable for both Verification and Open-set Identification tasks, (iii) may be employed to single sample galleries under an online setting, (v) can be implemented using parallel programming, and (v) extends the use of W-score normalization to multi-sample galleries. We use the UHDB11 and FRGC v2 Face databases to assess the performance of our framework. Specifically, the statistical hypothesis testing performed illustrate that the performance of our framework improves as we increase the number of samples per subject. Furthermore, it yields increased discriminability within the scores of each probe. Besides the benefits and limitations highlighted by our experimental evaluation, results under optimal and pessimal conditions are presented as well to provide better insights.

BRIEF DESCRIPTION OF THE DRAWINGS

The invention can be better understood with reference to the following detailed description together with the appended illustrative drawings in which like elements are numbered the same:

FIG. 1A depicts an overview of an embodiment of the framework of this invention. The framework includes identifying subsets represented by letters (e.g, X, Y and Z). The subscript of each letter denotes the index number of the corresponding biometric sample. The similarity scores are designated by the letter S, where the subscript denotes the identity and biometric sample, respectively. The Rank denotes the rank of each score S in relation to other scores with the same identity.

FIG. 7 depicts an overview of the present framework (color figure). The notation SX1 is used to denote the score obtained by comparing a given probe against the biometric sample indexed by 1 of the gallery subject labeled as X.

FIG. 17A-C depicts an embodiment of a method of this invention utilizing probe specific and gallery specific data.

DEFINITIONS USED IN THE INVENTION

Figure 1B:
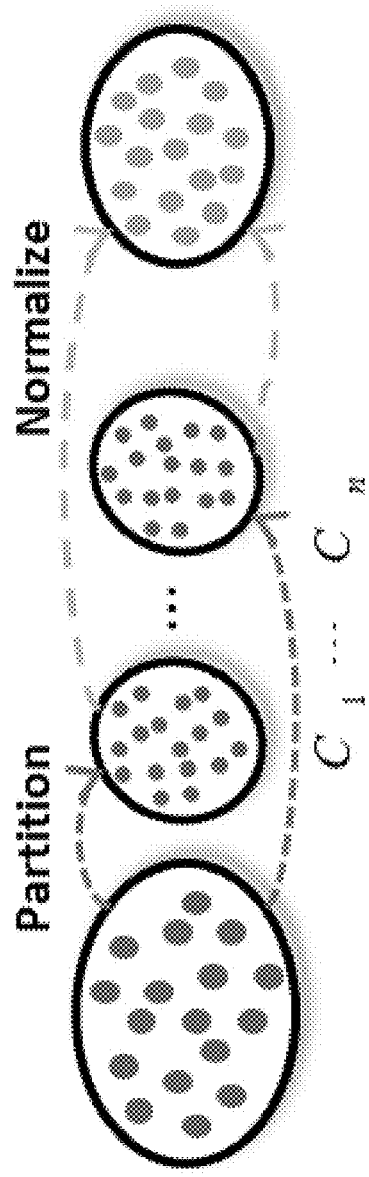
FIG. 1B depicts a second overview of an embodiment of the framework of this invention.

=The term "fusing" means to combine or integrate information from multiple sources.

DETAILED DESCRIPTION OF THE INVENTION

The inventors have found that a new rank-based score normalization framework for normalizing scores, where the framework partitions matching scores into subsets and normalize each subset independently. Methods include implementing two versions of the framework: (i) using gallery-based information (i.e., gallery versus gallery scores), and (ii) updating available information in an online fashion. The methods improve the detection and identification rate from 20:90% up to 35:77% for Z-score and from 25:47% up to 30:29% for W-score.

Embodiments of this invention relate broadly to methods for processing measures comprising the steps of obtaining a test sample, obtaining a set of indexed samples, and comparing the test sample to each, some, or all of the indexed samples to produce first measures. The methods also include computing first ranks for the first measures within each index, forming first subsets of all or any combination of current measures, where each first subset includes current measures of the same first rank, where the current measures for this step comprise the first measures, processing the current measures within each first subset that satisfy one condition or a plurality of conditions to form processed current measures, where the processing comprises one transformation or a plurality of transformations of the current measures, and outputting the current measures and the processed current measures.

In certain embodiments, the methods also include the steps of prior to the forming step, pre-processing the first measures to form first pre-processed measures, where the pre-processing comprises one transformation or a plurality of transformations of the first measures, fusing none, some, or all of the first measures, the first pre-processed measures, and/or the measures within each set to form first fused measures, performing the remaining steps of claim 1 using none, some, all, or sets of the current measures independently, where the current measures comprise the first measures, the first pre-processed measures, the first fused measures, or any combination thereof, and fusing none, some or all of the first measures, the first pre-processed measures, the first fused measures, the processed current measures, and the current measures to form second fused measures.

In other embodiments, the methods also include the steps of prior to the forming step, comparing the indexed samples to each other to produce second measures identified by each pair of indexed samples compared, assigning a second index to the first measures, creating a set for each indexed sample, where each set includes the first measure and the second measures for that indexed sample, computing second ranks for each measure within each of the sets based on the second index of the first measure and the second index of the second measures, where the second index of the second measures corresponds to the index of the samples used to produce the second measures of that set, forming second subsets for each set, where each subset includes second current measures of the same second rank, where the second current measures comprise the first measures and the second measures, and processing the measures within each second subset that satisfy one condition or a plurality of conditions to form second processed measures, where the processing comprises a one or a plurality of transformation of the measures, and performing the remaining steps of claim 1, using none, some, all, or sets of the current measures independently, where the current measures comprise the first measures, the second measures, the second processed measures, or any combination thereof.

In other embodiments, the methods also include the steps of prior to the forming step of claim 3, pre-processing the first measures to form first pre-processed measures, where the pre-processing comprises one transformation or a plurality of transformations of the first measures, pre-processing the second measures to form second pre-processed measures, where the pre-processing comprises one transformation or a plurality of transformations of the second measures, fusing (a) none, some, or all of the first measures and the first pre-processed measures to form first fused measures, (b) none, some, or all of the second measures and the second pre-processed measures to form second fused measures, or (c) none, some, or all of the first measures, the first pre-processed measures, the second measures and the second pre-processed measures to form mixed fused measures, preforming the remaining steps of claim 3, using none, some, all, or sets of the current measures independently, where the second current measures comprise the first measures, the first pre-processed measures, the first fused measures, the second measures, the second pre-processed measures, the second fused measures, or any combination thereof, and fusing none, some or all of the first measures, the first pre-processed measures, the first fused measures, the second measures, the second pre-processed measures, and the second fused measures to form third fused measures.

In other embodiments, the methods also include the steps of ignoring the second measures that compare the same sample within the indexed samples, or replacing the second measures that compare the same sample within the indexed samples with a new value.

In other embodiments, the methods also include the steps of assigning a new second index to the first measures, and retaining none, some, or all of the first measures as second measures of the formed sets if one condition or a plurality of conditions are satisfied.

In other embodiments, the methods also include the steps of assigning an index to the test sample, and incorporating the indexed test sample to the set of indexed samples before or after implementing the steps of claim 3, if one condition or a plurality of conditions are satisfied.

Embodiments of this invention relate broadly to methods for processing measures comprising the steps of obtaining a multi-modal test sample, where the test multi-modal sample comprises test sample data from multiple sources, obtaining multi-modal indexed samples, and comparing the multi-modal test sample to each, some, or all of the multi-modal indexed samples to produce first measures.

In certain embodiments, the methods also include the steps of computing first ranks for the first measures within each index, forming first subsets of all or any combination of current measures, where each first subset includes current measures of the same first rank, where the current measures for this step comprise the first measures, processing the current measures within each first subset that satisfy one condition or a plurality of conditions to form processed current measures, where the processing comprises one transformation or a plurality of transformations of the current measures, and outputting the current measures and the processed current measures.

In other embodiments, the methods also include the steps of prior to the forming step, pre-processing the first measures to form first pre-processed measures, where the pre-processing comprises one transformation or a plurality of transformations of the first measures, fusing none, some, or all of the first measures, the first pre-processed measures, and/or the measures within each set to form first fused measures, performing the remaining steps of claim 16 using none, some, all, or sets of the current measures independently, where the current measures comprise the first measures, the first pre-processed measures, the first fused measures, or any combination thereof and fusing none, some or all of the first measures, the first pre-processed measures, the first fused measures, the processed current measures, and/or the measures within each set to form second fused measures.

In other embodiments, the methods also include the steps of prior to the forming step, comparing the indexed samples to each other to produce second measures identified by each pair of indexed samples compared, assigning a second index to the first measures, creating a set for each indexed sample, where each set includes the first measure and the second measures for that indexed sample, computing second ranks for each measure within each of the sets based on the second index of the first measure and the second index of the second measures, where the second index of the second measures corresponds to the index of the samples used to produce the second measures of that set, forming second subsets for each set, where each subset includes second current measures of the same second rank, where the second current measures comprise the first measures and the second measures, processing the measures within each second subset that satisfy one condition or a plurality of conditions to form second processed measures, where the processing comprises a one or a plurality of transformation of the measures, and performing the remaining steps of claim 1, where the current measures comprise the first measures, the second measures, the second processed measures, or any combination thereof.

In other embodiments, the methods also include the steps of prior to the forming step of claim 18, pre-processing the first measures to form first pre-processed measures, where the pre-processing comprises one transformation or a plurality of transformations of the first measures, pre-processing the second measures to form second pre-processed measures, where the pre-processing comprises one transformation or a plurality of transformations of the second measures, fusing (a) none, some, or all of the first measures and the first pre-processed measures to form first fused measures, (b) none, some, or all of the second measures and the second pre-processed measures to form second fused measures, or (c) none, some, or all of the first measures, the first pre-processed measures, the second measures and the second pre-processed measures to form mixed fused measures, preforming the remaining steps of claim 18 using none, some, all, or sets of the current measures independently, where the second current measures comprise the first measures, the first pre-processed measures, the first fused measures, the second measures, the second pre-processed measures, the second fused measures, or any combination thereof, and fusing none, some or all of the first measures, the first pre-processed measures, the first fused measures, the second measures, the second pre-processed measures, the second fused measures, and/or the measures within each set to form third fused measures.

In other embodiments, the methods also include the steps of ignoring the second measures that compare the same sample within the indexed samples, or replacing the second measures that compare the same sample within the indexed samples with a new value.

In other embodiments, the methods also include the steps of ignoring the second measures that compare the same sample within the indexed samples, or replacing the second measures that compare the same sample within the indexed samples with a new value.

In other embodiments, the methods also include the steps of assigning a new second index to the first measures, and retaining none, some, or all of the first measures as second measures of the formed sets if one condition or a plurality of conditions are satisfied.

In other embodiments, the methods also include the steps of assigning an index to the test sample, and incorporating the indexed test sample to the set of indexed samples before or after implementing the steps of claim 18, if one condition or a plurality of conditions are satisfied.

Part I

For illustration purposes, we consider the following scenarios: (i) the gallery set is comprised of multiple samples per subject from a single modality, and (ii) the gallery is comprised of a single sample per subject from different modalities. We shall refer to the former scenario as unimodal and to the latter as multimodal. We note that the integration of scores in the unimodal scenario is an instance of the more general problem of combining scores in the multimodal scenario[12]. To distinguish between the two, we say that we integrate scores for the former, while we combine scores for the latter. We notice that a search in Google Scholar for the last ten years (i.e., 2002-2012) returns 322 papers that include the terms multimodal and biometric in their title, while only eight entries are found for the unimodal case. The question that arises is whether there is space for improvement in the performance of unimodal biometric systems.

This invention relates broadly to a rank-based score normalization framework that is suitable for unimodal systems, when multi-sample galleries are available. Specifically, the present approach is based on a first process for partitioning set of scores into subsets and then normalizing each subset independently. The normalized scores then may be integrated using any suitable rule. We use the Stochastic Dominance theory to illustrate that our approach imposes the subsets' score distributions to be ordered, as if each subset was obtained by a different modality. Therefore, by normalizing each subset individually, the corresponding distributions are being aligned and the system's performance improves. The present invention is also based on a second process that uses the gallery versus gallery scores to normalize the produced scores for a given probe in a gallery-based manner. The obtained normalized scores are then combined with the scores produced by the first algorithm or computer procedure using any combination rule. Finally, the third algorithm or computer procedure uses scores from already referenced probes to augment the gallery versus gallery similarity scores. Thus, it updates the available information in an online fashion. The framework of this invention: (i) does not require tuning of any parameters, (ii) may be implemented by using any score normalization technique and any integration rule, and (iii) extends the use of W-score normalization in multi-sample galleries. We are not evaluating combination or integration rules, nor are we assessing score normalization techniques. Instead, we focus on the fact that the present approach increases the performance of unimodal biometric systems. The experimental evaluation is performed using the BDCP Face Database[1].

Section I.2 reviews score normalization techniques and combination rules. Section I.3 provides an overview of the Stochastic Dominance theory and describes the present framework. Section I.4 presents the experimental results. Section I.5 concludes this part of the application with an overview of our findings.

I.2. Related Work

In this section, we do not present an extensive overview of the literature because the present framework may be implemented in conjunction with any combination rule and any score normalization technique. Therefore, we refer only to those approaches used in our experiments.

I.2.1. Combination Rules

Kittler et al.[9] have studied the statistical background of combination rules. Such rules address the general problem of fusing evidence from multiple measurements. Hence, they are applicable to both integration and combination tasks.[12] We note that the work by Kittler et al.[9] refers exclusively to likelihood values. These rules however are often applied to scores, even if there is not a clear statistical justification for this case. In this application, we have used the sum rule, which under the assumption of equal priors, is implemented by a simple addition. Even though this rule makes restrictive assumptions, it appears to yield good performance.[8,9]

I.2.2. Score Normalization Techniques

Score normalization techniques are used in order to: (i) accommodate for the variations between different biometric samples and, (ii) align score distributions before combining them. A comprehensive study of such approaches is offered by Jain et al.[8]

Z-Score

Due to its simplicity and good performance in many settings, this is one of the most widely used and well examined techniques. Specifically, it is expected to perform well when the location and scale parameters of the score distribution can be sufficiently approximated by the mean and standard deviation estimates, respectively. In addition, for scores following a Gaussian distribution this approach can retain the shape of the distribution. We note that the most notable disadvantages of Z-score normalization are: (i) it cannot guarantee a common numerical range for the normalized scores, and (ii) it is not robust, as the mean and standard deviation estimates are sensitive to outliers.

W-Score

Scheirer et al.[11] recently proposed the use of a score normalization technique that models the tail of the non-match scores. The greatest advantage of this approach is that it does not make any assumptions concerning the score distribution. It also appears to be robust and yields good performance. In order to apply W-score normalization, the user has to specify the number of scores to be selected for fitting. While in most cases it is sufficient to select as few as five scores, we have found that selecting a small number of scores in most cases yields discretized normalized scores. As a result, it is not possible to assess the performance of the system in low false acceptance rates or false alarm rates. On the other hand, selecting too many scores may violate the required assumptions needed to invoke the Extreme Value Theorem. Another limitation of W-score is that it cannot be applied to multi-sample galleries, unless an integration rule is used first (e.g., sum). Consequently, it is not possible to obtain normalized scores for each sample independently. As it will be shown, the present framework addresses this problem and extends the use of W-score normalization to multi-sample galleries.

I.3. Rank-Based Score Normalization Framework

In this section, we first review the Stochastic Dominance theory, which covers the theoretical background of the present framework. Then, we describe three computer procedures or algorithms that comprise the Rank-based Score Normalization Framework of this invention. Since each algorithm or computer procedure builds on top of the other, we begin from the most general case and build our way through to the most restricted cases. An overview of the present computer procedure or algorithm is presented in FIGS. 1A&B.

I.3.1. Stochastic Dominance Theory

In this section, we present basic concepts of the Stochastic Dominance theory, which is used to cover theoretical aspects of the present framework. We note that the theory of Stochastic Dominance falls within the domain of decision theory and, therefore, it is widely used in finance[14].

Definition

The notation $X \geq_{FSD} Y$ denotes that X first order stochastically dominates Y, if $$Pr\{X > z\} \geq Pr\{Y > z\} z \qquad (1)$$

As it is implicitly shown by this definition, the corresponding distributions will be ordered. This fact becomes more clear by the following lemma.

Lemma:

Let X and Y be any two random variables, then $$X \geq_{FSD} Y \rightarrow E[X] \geq E[Y] \qquad (2)$$

A proof of this Lemma may be found in Wolfstetter[14].

An illustrative example of first order stochastic dominance is depicted FIGS. 1A&B of Wolfstetter[14], where $\overline{F}(Z) \geq_{FSD} \overline{G}(z)$. We note that the first order stochastic dominance relationship implies all higher orders see Durlauf et al.[5] In addition, this relation is known to be transitive as implicitly illustrated in Birnbaum et al.[3] Finally, we bring to the reader's attention that the first order stochastic dominance may also be viewed as the stochastic ordering of random variables.

I.3.2. Rank-Based Score Normalization

In this section, we propose a Rank-based Score Normalization (RBSN) that partitions a set of scores into subsets and then normalizes each subset independently. We assume that the gallery includes multiple samples per subject. An overview is provided in Algorithm I.1 below. The notation to be used herein is as follows:

$S^p$: the set of similarity scores for a given probe p, when compared against a given gallery set $S_i^p$: the set of scores that correspond to the gallery subject with identity=i, $S_i^p \subseteq S^p$ $S_{i,r}^p$: the $r^{th}$ ranked score of $S_i^p$ $S^{p,N}$: the set of normalized scores for the given probe p $C_r$: the $r^{th}$ rank subset, $\cup_r C_r = S^p$ $|d|$: the cardinality of any given set d I: the set of unique gallery identities f: a given score normalization technique

---

Algorithm I.1 Rank-based Score Normalization

1:    procedure RBSN($S^p = \cup_i \{S_i^p\}$, f)
      Step 1:    Partition $S^p$ into subsets
2:       $C_r = \{\emptyset\}$, $\forall r$
3:       for r = 1 : $\max_i\{|S_i^p|\}$ do
4:          for all i ∈ I do
5:             $C_r = C_r \cup S_{i,r}^p$
6:          end for
7:       end for     ▷ (i.e., Cr = $\cup_i S_{i,r}^p$)
      Step 2: Normalize each subset $C_r$
8:       $S^{p,N} = \{\emptyset\}$
9:       for r = 1 : $\max_i\{|S_i^p|\}$ do
10:         $S^{p,N} = S^{p,N} \cup f(C_r)$
11:      end for
12:      return $S^{p,N}$
13:   end procedure

---

Step 1—Partition $S^p$ into Subsets:

The main goal is to partition the set of scores $S^p$ into subsets $C_r$. The term Sp notes the set of scores that correspond to the gallery subject with identity=i. Each subset Cr is formed by selecting the $r^{th}$ highest score from every set $S_i^p$. This procedure is repeated, until all scores in $S^p$ have been assigned to a subset $C_r$. Each curve in FIG. 2 depicts the kernel density estimate that corresponds to a subset $C_r$ obtained from Step 1 of RBSN.

Figure 2:
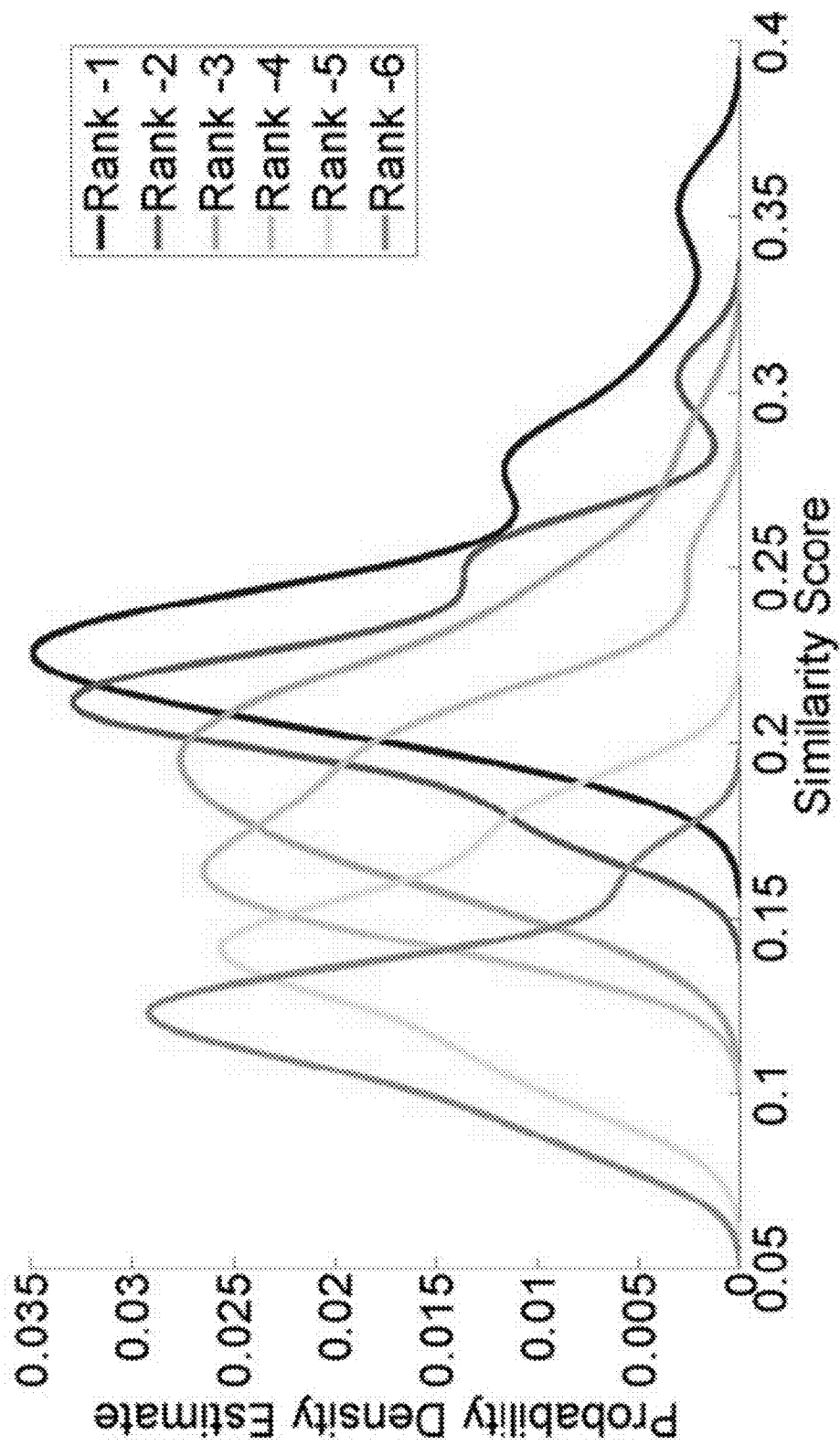
FIG. 2 depicts each curve depicts the kernel density estimate corresponding to a C, subset. Each subset C, was constructed by the Step 1 of RBSN, using the set $S^p$ from a random probe.

We now show that the ordering of the densities in FIG. 2 is imposed by the rank-based construction of the sub-sets $C_r$. By construction we have that $$S_{x,i}^p \geq S_{y,i}^p, \forall i \leq j \text{ and } \forall x \qquad (3)$$

Let $X_i$ and $X_j$ be the variables that correspond to $S_{x,i}^p$ and $S_{y,j}^p$ (i.e., $C_i$ and $C_j$). As shown in Hadar and Russell[8], this condition is sufficient to conclude that $X_i \geq_{FSD} X_j$. Given the relevant results from Section I.2.3, it is clear that the densities $P_{X_i}$ and $P_{X_{ij}}$ are ordered if i≠j.

Step 2—Normalize Each Subset $C_r$:

The set $S^{p,N}$ is initially an empty set which is gradually updated by adding normalized scores to it. Specifically, the scores for a given subset C, are normalized independently of the other subsets and then added to $S^{p,N}$. We iterate until the scores of all the subsets $C_r$ have been normalized and added to $S^{p,N}$.

I.3.2.1 Key Remarks and Implementation Details

We now explain why the obtained set $S^{p,N}$ yields increased performance compared to other approaches. Under the multimodal setting, a set of scores is obtained from each modality. Each such set consists of a single sample per gallery subject, and since they are obtained by different classifiers they are heterogenous. In order to increase the systems' performance, a score normalization step that maps the scores into a common domain is needed before they are combined[8,12]. The obtained subsets from Step 1 include by construction at most one sample per gallery subject and they are also ordered. Using exactly the same arguments made in previous works for the multimodal case, it is clear that our approach yields increased performance. After all, since we do not normalize scores from different modalities together, there is no good reason to do so under the unimodal scenario. One important limitation though is that we cannot make any inferences concerning the score distributions of the subsets $C_r$. Even if the set of scores for a given probe is known to follow a certain distribution, the resulting subsets might follow a different, unknown distribution. Despite this, our experiments indicate that RBSN yields increased performance in practice. In addition, the use of W-score normalization which does not make any assumptions concerning the scores' distribution is now feasible, as the constructed subsets include at most one score per subject.

Next, we provide a brief discussion concerning some implementation details. First, we note that ties may be broken arbitrarily as they do not affect the final outcome. Moreover, ranking the scores for each gallery subject can be implemented in parallel. The same applies for the normalization of each subset $C_r$. Hence, our framework is quite scalable. Finally, we note that gallery sets with different number of samples per subject result in subsets with different number of elements (see FIGS. 1A&B for such an example). Consequently, it is possible to obtain a subset which is too small to be used for score normalization. This is likely to happen for low rank subsets. In such cases, we may substitute or estimate these scores in many ways (e.g., use the corresponding normalized score we would obtain if RBSN was not used). For the purposes of this invention, we replace such scores with Not a Number (NaN) and we do not consider them at a decision level.

I.3.3. Rank-Based Score Normalization Framework Aided by Gallery-Based Information In this section, we present the Rank-based Score Normalization Framework aided by Gallery-based Information (GRBSN) that exploits additional information to improve the performance even further. Specifically, we compare the gallery against itself and we organize the produced scores using a symmetric matrix G. Each element $g_{i,j}$ corresponds to the similarity score obtained by comparing the $i^{th}$ and $j^{th}$ samples of the gallery. We summarize the present approach in Algorithm I.2 below. The additional notation to be used is as follows:

G: the gallery versus gallery similarity matrix, $G_{[n \times n]}$
$g_{i,j}$: the similarity score obtained by comparing the $i^{th}$ and the $j^{th}$ elements of the gallery, $g_{i,j} \in G$
n: the number of columns of G
$S^{p;N}$: the set of normalized scores $S^p$
h: an integration rule Note that there is a correspondence between G and $S^p$. That is, the $i^{th}$ row/column of G refers to the same gallery sample as the $i^{th}$ score of $S^p$.

Step 1—Augment G:

One more column is added to the matrix G[n×n] that is comprised of the scores in $S_{[n \times 1]}^p$ Step 2—Normalize the Augmented G:

Each row of the augmented matrix G is treated independently and normalized using RBSN. The probe p is unlabeled and thus the last score of each row of G is not associated with any identity.

---

Algorithm I.2 Rank-based Score Normalization
aided by Gallery-based Information

```
 1:  procedure GRBSN(G, S^p = ∪_i {S_i^p}, f, h)
     Step 1: Augment G
 2:      {g_{:,n+1}} = S^p                    ▷ n → n + 1
     Step 2: Normalize the Augmented G
 3:      w = h(RBSN(S^p;f))
 4:      Associate the n^th column of G with the gallery identity
         that corresponds to the Rank - 1 score of w
 5:      for i = 1 : |g_{:,1}| do
 6:          {g_{i,:}} = RBSN(g_{i,:}, f)
 7:      end for
     Step 3: Compute S^{p;N}
 8:      S^{p;N} = h(RBSN(S^p; f), g_{:,n})
 9:      return S^{p;N}
10:  end procedure
```

---

To address this problem, the $RBSN(S_p; f)$ is computed and an integration rule h is applied. The gallery identity that is associated with the resulting Rank-1 score is used to label the scores of the last column of the augmented matrix G. Normalizing each row of G using RBSN is now feasible and the row-wise normalized matrix G is obtained. In practice, each time that we apply RBSN we only need to normalize the $C_r$ that corresponds to the score of the last column of G. In addition, the normalization of each row of G can be implemented in parallel.

Step 3—Compute $S^{p,N}$:

The last column of the augmented matrix G contains the Gallery-Specific normalized scores that correspond to the probe p. The $RBSN(S^p, f)$ corresponds to the Probe-Specific normalized scores for the same probe p. Consequently, the two vectors are combined using the relevant rule h.

In this approach, each score of $S^p$ is normalized in relation to: (i) scores in $S^p$, and (ii) scores contained in each row of G (see FIGS. 1A&B). Thus, we obtain both Probe-specific and Gallery-specific normalized scores, using each time two different sources of information. Since the same rules are suitable when combining evidence for multiple measurements in general", combining the two vectors is reasonable and results in increased performance.

I.3.4. Online Rank-Based Score Normalization Framework

In this section, we build upon the GRBSN procedure and present an online version of the present framework (ORBSN). This version uses information from probes that have been submitted to the system in the past in order to enhance the available information. We provide an overview of the Online Rank-based Score Normalization Framework in Algorithm I.3 below. As in the previous section, we use information from the gallery versus gallery scores. The additional notation to be used is as follows:

P: the set of probes presented to the system
S: the set of scores for all probes, $\cup_p S^p = S$
$S^N$: the set of normalized scores S
t: the threshold used to reach a decision

| Algorithm I.3 Online Rank-based Score Normalization |
| --- |
| 1: procedure ORBSN(G, S =S $\cup_p\{S^p\}$, f, h, t) |
| 2:    for all p = 1 : \|P\| do |
|      Step 1: GRBSN |
| 3:       $S^{p,N}$= GRBSN(G; $S^p$; f; h) |
|      Step 2: Augment G |
| 4:       w = h($S^{p,N}$) |
| 5:       if max(w) ≥ t then |
| 6:          $\{g_{:,n+1}\} = S^p$    ▸n → n + 1 |
| 7:       end if |
| 8:    end for |
| 9:    return [$S^N = \cup_p\{S^{p,N}\}$;G] |
| 10: end procedure |

Step 1—GRBSN:

In this step, GRBSN is applied using the corresponding inputs.

Step 2—Augment G:

If the system is confident that the probe is part of the gallery the input matrix G is augmented. Specifically, if the Rank-1 score of the h($S^{p,N}$) is above a given threshold t a new column is added to G comprised of the raw scores in $S^p$. In other words, this probe becomes part of the matrix G and it will be used when the next probe is submitted to the system. Note that the matrix G contains raw scores at all times and it is only normalized implicitly when GRBSN is invoked.

The intuition of ORBSN is very similar with the idea presented in the section I.3.3. That is, we use Gallery-specific score normalization to increase the performance. When the system is confident about the identity of an unknown probe, it incorporates its scores to the gallery-based information (i.e., matrix G). This way, the available information is enhanced in an online fashion in order to improve the performance even further. However, we note that the performance of both GRBSN and ORBSN is sensitive to the identity estimation of each submitted and/or referenced probe.

I.4. Experimental Results

In this section, we provide information about: (i) the database used, (ii) implementation details, (iii) evaluation measures, and finally (iv) experimental results.

The BDCP Database:

The BDCP Face database consists of data from 100 subjects[1]. The gallery set is formed by 95 subjects for which 381 3D images have been captured using the Minolta VIVID 900/910 sensor. The number of samples per gallery subject varies from 1 to 6. The probe set is comprised of data from all 100 subjects. Specifically, 2,357 2D images are used which have been captured by four different cameras: (i) Nikon D90, (ii) Canon Powershot Elph SD1400, (iii) Olympus FE-47, and (iv) Panasonic Lumix FP1. The composition of the probe set is: (i) 876 Far Non-Frontal, (ii) 880 Far Frontal, (iii) 305 Near Non-Frontal, and (iv) 296 Near Frontal Faces. The scores used in this application are available from Todericiof[13].

Implementation Details:

As mentioned before, it is not possible to use W-score normalization directly to multi-sample galleries. Consequently, when reporting results for W-score, it is implied that the scores have been integrated before they are normalized. We note that: (i) five scores are used to fit a Weibull distribution, and (ii) the sum rule is used whenever it is needed to combine scores. Therefore, we use the notation RBSN:Z-score to indicate that Z-score normalization has been used as an input to Algorithm I.1 and the resulting normalized scores have been integrated using the sum rule.

As mentioned, normalizing sets with small number of elements is usually problematic. Therefore, we do not normalize subsets C, that include less that six scores; instead, we replace these values by NaN. We do the same for subsets that have a standard deviation less than $10^{-5}$, because in such cases Z-score becomes unstable. Finally, in order to assess the performance of ORBSN, we have followed a Leave-One-Out approach. Each time we assume that \|P\|−1 probes have been submitted to the system and a decision has to be made for the remaining one. The system uses a threshold to select a subset of the \|P\|−1 probes for which it is confident concerning the estimated identity. Then, the corresponding scores are incorporated to G and ORBSN is implemented as in Algorithm I.3. In our implementation, the system used the gallery versus gallery scores to select a threshold that results in a False Alarm Rate of $10^{-3}$. The reasoning behind this decision is that, even if only a few probes will be selected to update the matrix G, the corresponding information will be reliable. In other words, we prefer selecting a small number of probes that add information of a good quality, rather than selecting many probes that induce noise.

Performance Measures:

We used the osi-ROC that compares the Detection and Identification Rate (DIR) against the False Alarm Rate (FAR) to provide an overview of the system's performance for the Open-set Identification task[2]. For the same task, we also used the Open-set Identification Error (OSI-E). That is the rate at which the max score for a probe corresponds to the wrong identity given that the subject depicted in the probe is part of the gallery[6]. Specifically, the OSI-E is inversely proportional to the percentage of correct classifications based on the rank-1 scores for probes in the gallery, a metric that is usually reported for the closed-set identification task. Moreover, we used the ROC that compares Verification Rate (VR) against the False Acceptance Rate (FAR) to assess the discriminability of the scores. Note that different methods result in FARs with different ranges and hence we cannot compare directly quantities such as Area Under the Curve (AUC) and max-DIR. Therefore, we select a common FAR range by setting the universal lower and upper bound to be equal to the infimum and supremum, respectively. Finally, we denote ΔAUC the relative improvement of the raw scores performance (e.g., ΔAUC=(AU-$C_{RBSN}$−AUC$_{raw}$)/AUC$_{raw}$).

Experiment I.1

Figure 3:
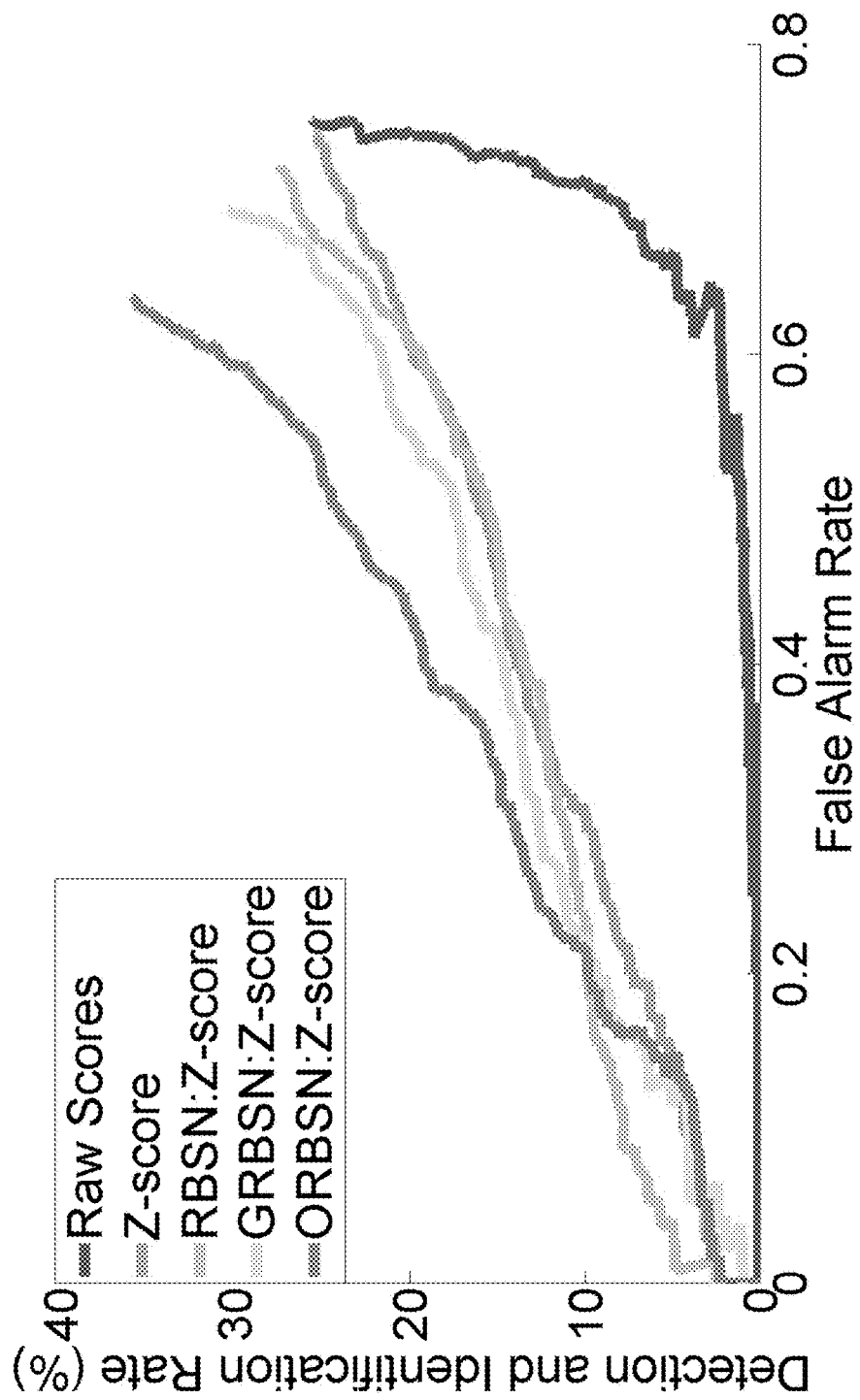
FIG. 3 depicts an osi-ROC curve illustrating the performance of different approaches for an Open-set Identification task on the BDCP database.

The objective of the this experiment is to assess the performance of the present framework under the Open-set Identification task. Specifically, each of the 2,357 probes is compared against the gallery to obtain the corresponding similarity scores. Based on FIG. 3 and Table I.1, it appears that the present framework improves the overall DIR performance. Note that the performance in most of the evaluation measures gradually improved when RBSN, GRBSN, and ORBSN were used.

TABLE I.1

Summary of the results from the Experiments I.1 & I.2

| BDCP Database | Open-set Identification | | | Verification |
| --- | --- | --- | --- | --- |
| Methodology | OSI-E (%) | max-DIR (%) | osi-ΔAUC | vr-ΔAUC |
| Z-score | 70.93 | 20.90 | 15.15 | 0.11 |
| RBSN:Z-score | 68.88 | 22.03 | 16.87 | 0.19 |
| GRBSN:Z-score | 66.06 | 23.73 | 17.27 | 0.17 |
| ORBSN:Z-score | 60.54 | 35.77 | 21.83 | 0.18 |
| W-score | 74.53 | 25.47 | 0.01 | 0.10 |

TABLE I.1-continued

Summary of the results from the Experiments I.1 & I.2

| BDCP Database | Open-set Identification | | | Verification |
|---|---|---|---|---|
| Methodology | OSI-E (%) | max-DIR (%) | osi-ΔAUC | vr-ΔAUC |
| RBSN:W-score | 74.88 | 25.12 | −0.02 | 0.11 |
| GRBSN:W-score | 72.01 | 27.99 | 0.08 | 0.12 |
| ORBSN:W-score | 69.71 | 30.29 | 0.12 | 0.13 |

The OSI-E and max-DIR refer to absolute values, where for the latter the maximum performance is reported. The osi-ΔAUC and vr-ΔAUC refer to the relative improvement of the raw scores performance. The relative experimental protocol is described in Section I.4.

In addition, we note that most of the score normalization approaches are linear transformations. Hence, they cannot change the order of scores for a given probe. In other words, they cannot effect the OSI-E[6]. However, the present framework appears to significantly reduce the OSI-E (see Table I.1). This is attributed to the fact that it normalizes each subset $C_r$ independently and the final ordering of the scores is thus changed. In order to investigate this fact even further, we used statistical hypothesis tests to show that the discriminability of the scores for a given probe increases when our framework was used. Specifically, for each probe we computed the ROC curves and the corresponding AUCs. We used these AUC values to perform a non-parametric Wilcoxon Signed-Rank test in order to determine whether the relative median values are equal (i.e., null hypothesis) or the present framework performs better (i.e., one sided alternative hypothesis). The Bonferonni correction was used in order to ensure that the overall statistical significance level (i.e., $\alpha=5\%$) is not overestimated due to multiple tests performed. That is, the statistical significance of each individual test is set to $\alpha/m$, where m is the number of tests performed. The corresponding p-values are: (i) Z-score vs. Raw Scores: 1, (ii) RBSN:Z-score vs. Z-score: $9.5\times10^{-92}$, and (iii) RBSN:W-score vs. Raw Scores: 0.0025. The test W-score vs. Raw Scores cannot be performed due to the fact that W-score is not applicable to multi-sample galleries. According to these results, we conclude that the discriminability of scores for each probe increases significantly when the present framework was used (i.e., the null hypothesis was rejected). However, this is not the case for Z-score, which yields identical AUC values to the raw scores.

Experiment I.2

Figure 4:
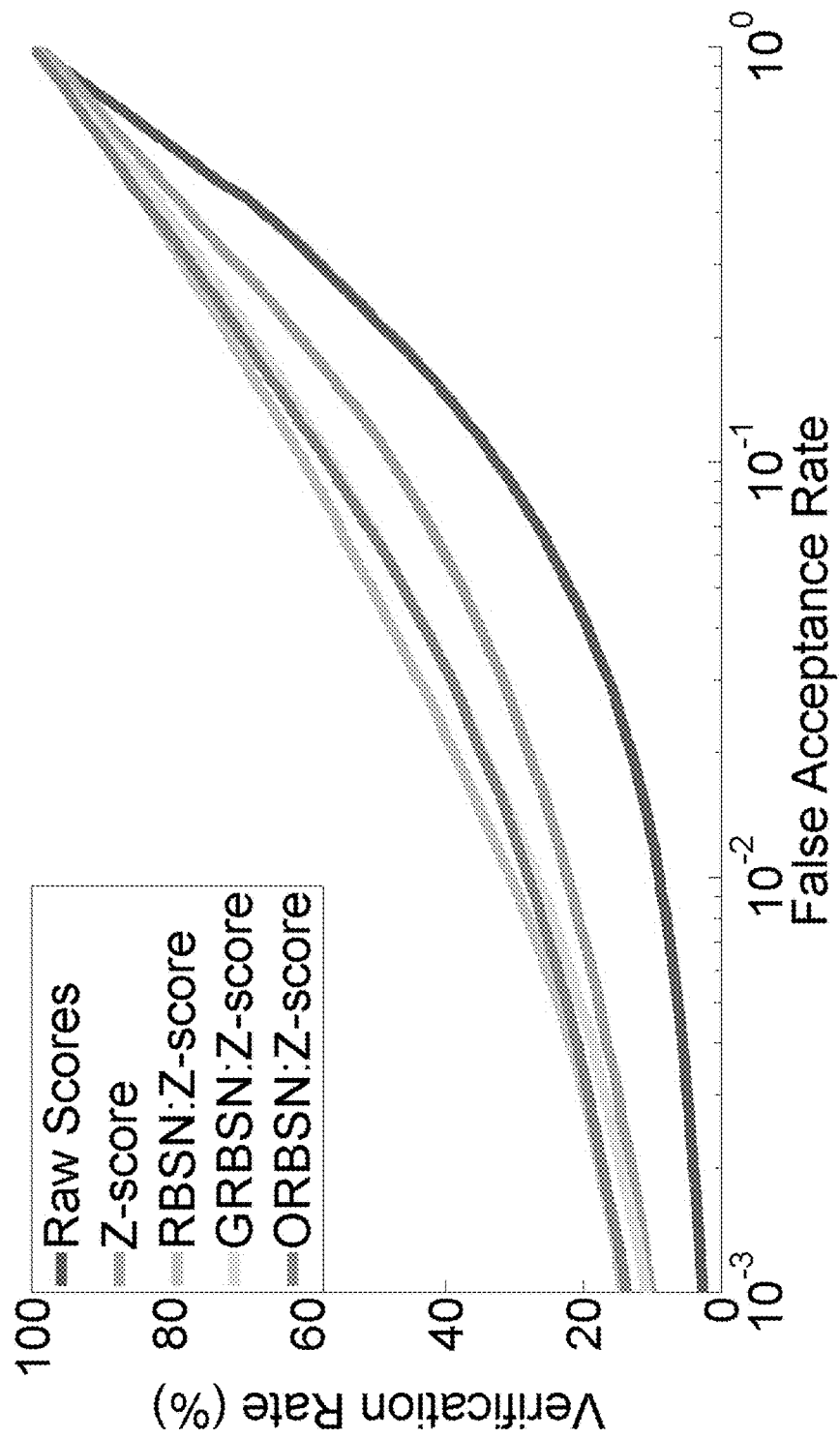
FIG. 4 depicts a vr-ROC curve illustrating the performance of different approaches for a Verification task on the BDCP database.

In objectives of this experiment are to illustrate: (i) the use of the present framework for a Verification task, and (ii) the increased discriminability that it yields. Specifically, we assume that each probe targets all the gallery samples, one at a time. We further assume that each time this happens the rest of the gallery samples may be used as cohort information. Although the experimental protocol employed is an unlikely scenario, it provides rich information for evaluating the performance of the present framework under a Verification task. Based on the relative experimental results it appears that the present framework improves the verification performance. The corresponding ROC curves for Z-score are depicted in FIG. 4. Note that RBSN outperforms both GRBSN and ORBSN when Z-score is used. We identify this cause to be the poor identity estimates that the corresponding computer procedure or algorithm use. Specifically, we observed that ORBSN appears to be more robust, even though it aggregates the GRBSN errors. This is due to two reasons: (i) it uses more information, and (ii) it uses a threshold to filter the information to be used. Consequently, one obvious modification of Algorithm I.2 would be to use gallery-based normalization only when the system is confident concerning the estimated identity (i.e., use a threshold). This approach though is not followed in our implementation in an effort to minimize the number of parameters used in each algorithm or computer procedure. An alternative solution would be to normalize the scores in a Gallery-based manner without implementing RBSN. In this way, it would not be necessary to estimate the probe's identity but on the other hand the quality of the normalized scores obtained would be of a lower quality.

Experiment I.3

Figure 5:
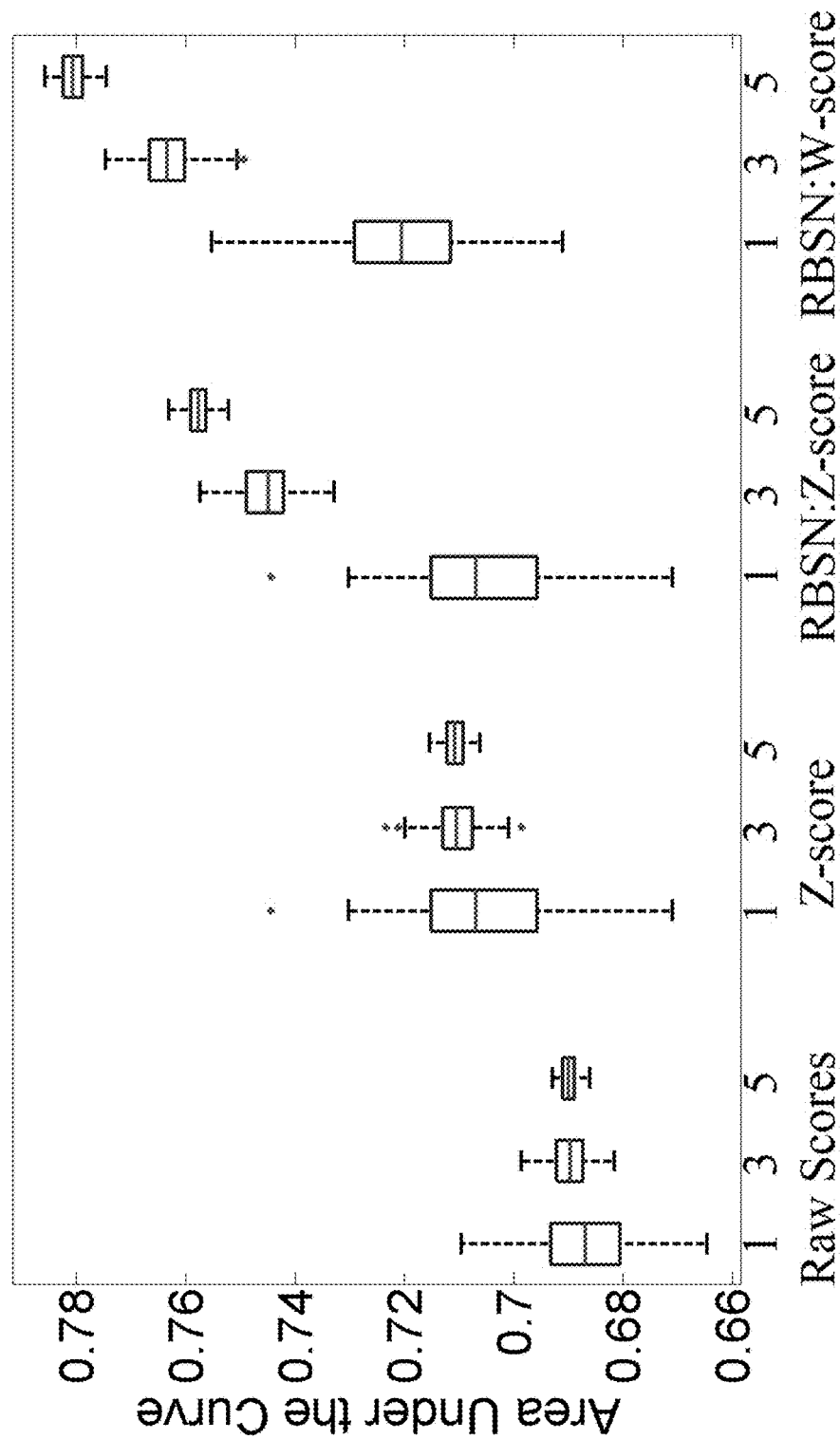
FIG. 5 depicts boxplots for: (i) Raw Scores, (ii) Z-score, (iii) RBSN:Z-score, and (iv) RBSN:W-score when 1, 3 and 5 samples per gallery subject are randomly selected.

The objective of this experiment is to assess the effect that different number of samples per gallery subject has to the performance of RBSN. To this end, we randomly selected one, three, and five number of samples per subject and computed the ROC and the corresponding AUCs. This procedure was repeated 100 times and the obtained values are depicted in the corresponding boxplots shown in FIG. 5. For the statistical evaluation of these results we used the non-parametric Mann-Whitney U test. Specifically, the null hypothesis assumes that the median values are equal when three and five samples were used, while the alternative assumes that the median AUC value was increased when five samples were used. The obtained p-values are: (i) Raw Scores: 0.3511, (ii) Z-score: 0.2182, (iii) RBSN:Z-score: $2.1\times10^{-33}$, and (iv) RBSN:W-score: $1.3\times10^{-34}$. The statistical evidence indicates that an increase in the number of samples per gallery subject results in improved discriminability when the present framework was used. As in Experiment I.2, the Bonferonni correction ensures that the overall statistical significance is $\alpha=5\%$. Finally, we note that by repeating the same tests for five samples per subject versus one sample per subject the null hypothesis was rejected for all the methods. However, the former set of tests illustrated that an increase in the number of samples per subject results in greater increase of performance when our framework was employed compared to when our framework was not used for score normalization.

I.5. System

Figure 6:
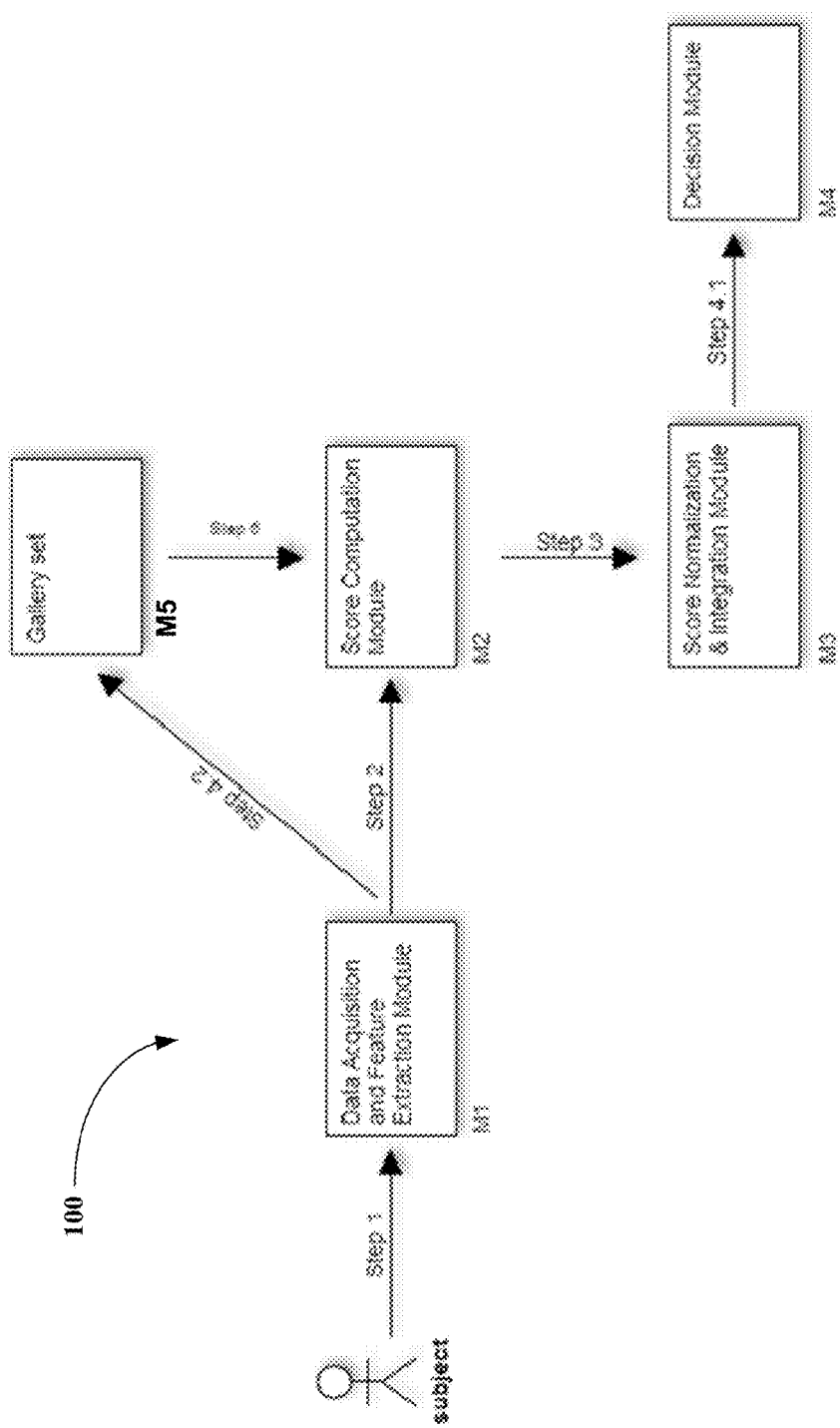
FIG. 6 depicts a system for implementing the framework of this invention.

Referring now to FIG. 6, an embodiment of systems and methods of this invention, generally 100, is shown to include identifying a subject. The systems include a first or data acquisition and feature extraction or first module M1. A first step, step 1, involves acquiring user or class specific data using the first module M1, where the data may be biometric data, speech data, medical data, medical imagining data, any other user specific or class specific data or any other data that can be used for multi-class classification problems. The system 100 also includes a second or score computation module M2. A second step, step 2, involves transferring the data acquired in the first module M1 to the second module M2, where the second module M2 produces similarity scores. The system 100 also includes a third or score normalization and integration module M3 for normalizing the scores generated in the second module M2 in a ranked-based manner. A third step, step 3, transfers scores generated in the second module M2 to the third or score normalization and integration module M3. A fourth step, step 4.1, transfers the output of the similarity scores module M3 to the fourth module M4 for making a decision based on the processed scores, e.g., normalized or normalized and integrated scores. A fifth step, step 4.2, transfers the acquired data to a gallery set module M5, because as the system operates, the gallery set may be enhanced. A sixth step, step 6 transfers data from the gallery set module M5 to the score computation module M2 to obtain the available information that is used for score computation.

I.6. Conclusions

We demonstrated a rank-based score normalization framework for multi-sample galleries that included three different computer procedure or algorithm. Unlike other approaches[4,10], our first algorithm or computer procedure uses the rank of the scores for each gallery subject to partition the gallery set and normalizes each subset individually. The second algorithm or computer procedure exploits gallery-based information, while the third algorithm or computer procedure updates the available information in an online fashion. The experimental evaluation indicates that the use of our framework for unimodal systems results in increased performance when multiple samples per subject are available. Specifically, according to the relevant statistical tests the performance of our framework improves as we increase the number of samples per subject. Also, it yields increased discriminability within the scores of each probe.

PART I REFERENCES OF THE INVENTION

The following references were cited in the application contain general background information used to support and explain certain aspects of the invention:

[1] University of Notre Dame, Computer Vision and Research Laboratory: Biometrics Data Sets.
[2] Biometrics glossary, Sep. 14, 2006.
[3] M. Birnbaum, J. Patton, and M. Lott. Evidence against rank dependent utility theories: tests of cumulative independence, interval independence, stochastic dominance, and transitivity. *Organizational Behavior and Human Decision Processes,* 77(1):44-83, 1999.
[4] R. Brunelli and D. Falavigna. Person identification using multiple cues. *IEEE Transactions on Pattern Analysis and Machine Intelligence,* 17(10):955-966, 1995.
[5] S. Durlauf and L. Blume. The new palgrave dictionary of economics. Palgrave Macmillan, 2008.
[6] J. Fortuna, P. Sivakumaran, A. Ariyaeeinia, and A. Malegaonkar. Relative effectiveness of score normalisation methods in open-set speaker identification. In *Proc. The Speaker and Language Recognition Workshop,* Toledo, Spain, May 31-Jun. 3, 2004.
[7] J. Hadar and W. R. Russell. Rules for ordering uncertain prospects. *The American Economic Review,* 59(1):pp. 25-34, 1969.
[8] A. Jain, K. Nandakumar, and A. Ross. Score normalization in multimodal biometric systems. *Pattern Recognition,* 38(12):2270-2285, 2005.
[9] J. Kittler, M. Hatef, R. Duin, and J. Matas. On combining classifiers. *IEEE Transactions on Pattern Analysis and Machine Intelligence,* 20(3):226-239, 1998.
[10] K. Nandakumar, A. Jain, and A. Ross. Fusion in multibiometric identification systems: what about the missing data? Advances in Biometrics, pages 743-752, 2009.
[11] W. Scheirer, A. Rocha, R. Micheals, and T. Boult. Robust fusion: extreme value theory for recognition score normalization. In *Proc. European Conference on Computer Vision,* volume 6313, pages 481-495, Crete, Greece, Sep. 5-11, 2010.
[12] G. Shakhnarovich, J. Fisher, and T. Darrell. Face recognition from long-term observations. In *Proc. European Conference on Computer Vision,* pages 851-865, Copenhagen, Denmark, May 27-Jun. 2, 2002.
[13] G. Toderici, G. Passalis, S. Zafeiriou, G. Tzimiropoulos, M. Petrou, T. Theoharis, and I. Kakadiaris. Bidirectional relighting for 3D-aided 2D face recognition. In *Proc. IEEE Computer Society Conference on Computer Vision and Pattern Recognition,* pages 2721-2728, San Francisco, Calif., Jun. 13-18, 2010.
[14] E. Wolfstetter. *Stochastic dominance: theory and applications.* Humboldt-Univ., Wirtschaftswiss. Fak., 1993.

Part II

II.1. Introduction

Herein, we focus on score normalization for Verification and Open-set Identification for unimodal biometric systems. Verification is the task of comparing a probe against one or more previously enrolled samples to confirm a subject's claimed identity. The Open-set Identification is a two-step process: (i) determine whether a probe is part of the gallery, and if it is (ii) return the corresponding identity. The most common approach is to select the maximum matching score for a given probe and compare it against a given threshold. In other words, we match the probe against the gallery subject that appears to be the most similar to it. As a result, the Open-set Identification problem can be considered to be a hard Verification problem. A more detailed discussion about this point of view is provided by Fortuna et al.[1] The performance of biometric systems is usually degraded by a number of variations that may occur during data acquisition. For example, differences in pose, illumination and other conditions may occur. Consequently, each time that a different probe is compared against a given gallery the matching scores obtained follow a different distribution. One of the most efficient ways to address this problem is score normalization. Such techniques map scores to a common domain where they are directly comparable. As a result, a global threshold may be found and adjusted to the desired value. Score normalization techniques are also very useful when combining scores in multimodal systems. Specifically, classifiers from different modalities produce heterogeneous scores. Normalizing scores before combining them is thus crucial for the performance of the system[2]. Even though this application is not concerned with multimodal systems the relevant results of prior research are useful in understanding the intuition behind the present framework.

For the rest of this section we consider the following scenarios unless otherwise indicated: (i) the gallery is comprised of multiple samples per subject from a single modality, and (ii) the gallery is comprised of a single sample per subject from different modalities. We shall refer to the former scenario as unimodal and to the latter as multimodal. We note that the fusion of scores in the unimodal scenario is an instance of the more general problem of fusing scores in the multimodal scenario[3]. To distinguish between the two, we say that we integrate scores for the former while we combine scores for the latter. We notice that a search in Google Scholar for the last ten years (i.e., 2002-2012) returns 333 papers that include the terms multimodal and biometric in their title while only eight entries are found for the unimodal case, respectively. The question that arises is whether there is space for improvement in the performance of unimodal biometric systems.

Herein, we present a rank-based score normalization framework that includes three computer procedure or algorithm where each of them is innovative in a different way. The first algorithm or computer procedure partitions a set of scores into subsets and then normalizes each subset independently when multiple samples per subject are available. The normalized scores may then be integrated using any suitable rule. We invoke the Stochastic Dominance theory to illustrate that our rank-based approach imposes the subsets' score distributions to be ordered as if each subset was obtained by a different modality. Therefore, by normalizing each subset individually the corresponding score distributions become homogeneous and the performance increases. The second algorithm or computer procedure exploits the gallery-based information to normalize scores in a Gallery-specific manner, when the system is confident concerning the probe's estimated identity. The normalized scores are then combined with the output of the first algorithm or computer procedure. Finally, the third algorithm or computer procedure dynamically augments the gallery in an online fashion. That is, the system incorporates probes to the gallery when a confidence level about their estimated identity has been reached. As set forth above[4], however: (i) the second algorithm or computer procedure always exploited the gallery based information, and (ii) the gallery-based information was augmented without incorporating probes to the gallery. As a result, the framework did not have a mechanism to deal with incorrect identity estimates. Moreover, it was only applicable to multi-sample galleries. The present version of our framework on the other hand is applicable to single-sample galleries under an online setting. We also pose questions about uninvestigated problems up to this date and suggest relevant directions for future research. Besides the proposed extensions we further provide better insights and a more detailed experimental evaluation. Specifically, we use the FRGC v2[5-6] and UHDB11 Face Databases' that provide more match scores and a greater variability during the data acquisition conditions, respectively. In addition, we employ the Z-score, MAD and W-score[8] normalization techniques in conjunction with the max and sum fusion rules. Moreover, we present comparative results between the present extensions and the computer procedure or algorithm present in Part I along with results under optimal and pessimal conditions. Finally, we note that this part is not to evaluate combination or integration rules nor to assess score normalization techniques. Instead, we present an approach that has the potential to increase the performance of unimodal biometric systems.

The rest of this part of the application is organized as follows: section II.2 reviews score normalization techniques and fusion rules, section II.3 provides an overview of the Stochastic Dominance theory and describes the present computer procedure or algorithm, section II.4 presents the relevant experimental results, section II.5 provides a discussion about possible directions for future research, and section II.6 concludes this part of the application with an overview of our findings.

II.2. Related Work

In this section, we focus on the advantages and limitations of the methods that we used in our experiments. This is due to the fact that the present framework can be implemented in conjunction with any score normalization technique and any fusion rule.

II.2.1 Fusion Rules

Kittler et al.[9] have studied the statistical background of fusion rules. Such rules address the general problem of fusing evidence from multiple measurements. Hence, they may be used to both integrate and combine scores[3]. We note, however, that the work by Kittler et al.[9] refers exclusively to likelihood values. Nevertheless, such rules are often applied to scores even if there is not a clear statistical justification for this case. Herein, we have used the sum and max rules. The former was implemented by a simple addition under the assumption of equal priors. Even though this rule makes restrictive assumptions it appears to yield good performance as demonstrated in Kittler et al.[9] and Nandakumar et al.[2] The latter on the other hand makes less restrictive assumptions, and it is also very simple to implement. Specifically, the output of this rule is defined to be the maximum score obtained.

II.2.2 Score Normalization Techniques

Score normalization techniques were used in order to: (i) accommodate for the variations between different biometric samples (e.g., probes) and, (ii) make score distributions from multimodal biometric systems homogeneous before combining them. A comprehensive study of such approaches is offered by Jain et al.[2]

Z-Score

Due to its simplicity and good performance in many settings this is one of the most widely used and well examined techniques. In particular, it is expected to perform well when the location and scale parameters of the score distribution may be approximated sufficiently by the mean and standard deviation estimates, respectively. Additionally, for Gaussian scores this approach may retain the shape of the distribution. The most notable disadvantages of Z-score normalization are: (i) it cannot guarantee a common numerical range for the normalized scores, and (ii) it is not robust as the mean and standard deviation estimates are sensitive to outliers.

Median and Median Absolute Deviation (MAD)

This score normalization technique replaces the mean and standard deviation estimates in the Z-score formula with the median value and the median absolute deviation, respectively. Therefore, it addresses the problem of robustness due to outliers. On the other hand though it is not optimal for scores that follow a Gaussian distribution.

W-Score

Scheirer et al.[8] recently proposed the use of a score normalization technique that models the tail of the non-match scores. The greatest advantage of this approach is that it does not make any assumptions concerning the score distribution. It also appears to be robust and yields good performance. However, in order to employ W-score the user has to specify the number of scores to be selected for fitting. While in most cases it is sufficient to select as few as five scores we have found that selecting a small number of scores yields discretized normalized scores. Consequently, it is not possible to assess the performance of the system in low false acceptance rates or false alarm rates. On the other hand, selecting too many scores may violate the assumptions required to invoke the Extreme Value Theorem. Another limitation of W-score is that it cannot be applied to multi-sample galleries unless an integration rule is first employed. Consequently, it is not possible to obtain normalized scores for each sample independently. As it will be demonstrated the proposed framework addresses this problem and extends the use of W-score to multi-sample galleries.

II.3. Rank-Based Score Normalization Framework

In this section, we first review the theory of Stochastic Dominance which is an important part of the theoretical background of our approach. Then, we describe the three computer procedures or algorithms that comprise the Rank-based Score Normalization Framework. Since each computer procedure or algorithm builds on top of the other we begin from the most general case and build our way through to the most restricted one. At the end of each section we provide a brief discussion with our insights along with implementation details. An overview of the present computer procedure or algorithm is presented in FIG. 7.

II.3.1 Stochastic Dominance Theory

In this section, we present basic concepts of the stochastic dominance theory which is used to cover theoretical aspects of the present framework. We note that the theory of stochastic dominance falls within the domain of decision theory and therefore it is widely used in finance.

Definition

The notation $X \geq_{FSD} Y$ denotes that X first order stochastically dominates Y, that is $$Pr\{X > z\} \geq \{Y > z\}, \forall z \qquad (1)$$

As it is implied by this definition the corresponding distributions will be ordered. This fact becomes more clear by the following lemma (its proof may be found in Wolfsetter et al.[10]).

Lemma:
Let X and Y be any two random variables, then $$X \geq_{FSD} Y \Rightarrow E[X] \geq E[Y] \qquad (2)$$

An illustrative example of first order stochastic dominance is depicted in FIG. 1 of Wolfstetter et al.[10] where for $F(Z) \geq_{FSD} G(z)$. Note that the first order stochastic dominance relationship implies all higher orders Durlauf et al.[11] In addition, this relation is known to be transitive as implicitly illustrated by Birnbaum et al.[12] Finally, the first order stochastic dominance may also be viewed as the stochastic ordering of random variables.

II.3.1.1 Key Remarks

Score normalization techniques are used to make score distributions of different probes and/or different modalities homogeneous. In section II.3.2, we invoke the theory of stochastic dominance to illustrate that a rank-based partitioning of the scores for a single probe yields subsets with ordered score distributions. Therefore, by normalizing the scores of each resulting subset we make the corresponding score distributions homogeneous and increase the discriminability of the scores on a per probe basis.

II.3.2 Rank-Based Score Normalization

In this section, we present the Rank-based Score Normalization (RBSN) that partitions a set of scores into subsets and then normalizes each subset independently. This compute procedure or algorithm may be employed under this assumption that multiple biometric samples per subject are available. An overview is provided in Algorithm II.1 below. The notation to be herein are as follows:

$S^p$: the set of match scores for a given probe p, when compared against a given gallery set
$S_i^p$: the set of scores that correspond to the gallery subject with identity=i, $_i^p S \subseteq S^p$
$S_{i,r}^p$:: the rank-r score of $S_i^p$
$S^{p;N}$: the set of normalized scores for the given probe p
$C_r$: the rank-r subset, $\cup_r C_r = S^p$
$|d|$: the cardinality of any given set d
I: the set of unique gallery identities
f: a given score normalization technique Algorithm II.1 Rank-based Score Normalization 1:     procedure RBSN($S^p = \cup_i \{S_i^p\}$, f)
        Step 1:    Partition $S^p$ into subsets
2:         $C_r = \{\emptyset\}, \forall r$
3:         for r = 1 : $\max_i\{|S_i^p|\}$ do
4:             for all i ∈ I do
5:                 $C_r = C_r \cup S_{i,r}^p$
6:             end for
7:         end for    ▷(i.e., Cr = $\cup_i S_{i,r}^p$)
        Step 2: Normalize each subset $C_r$
8:         $S^{p,N} = \{\emptyset\}$
9:         for r = 1 : $\max_i\{|S_i^p|\}$ do Algorithm II.1 Rank-based Score Normalization 10:         $S^{p;N} = S^{p;N} \cup f(C_r)$
11:         end for
12:         return $S^{p;N}$
13:     end procedure Step 1—Partition $S^p$ into Subsets The main objective of this step is to partition the set of scores $S^p$ into subsets $C_r$. The symbol $S_i^p$ denotes the set of scores that correspond to the gallery subject with identity equal to i. Each subset $C_r$ is formed by selecting the rank-r score from every set $S_i^p$. This procedure is repeated until all scores in $S^p$ have been assigned to a subset $C_r$. Each curve in FIG. 8 depicts the probability density estimate that corresponds to a subset $C_r$ obtained from Step 1 of RBSN.

Figure 8:
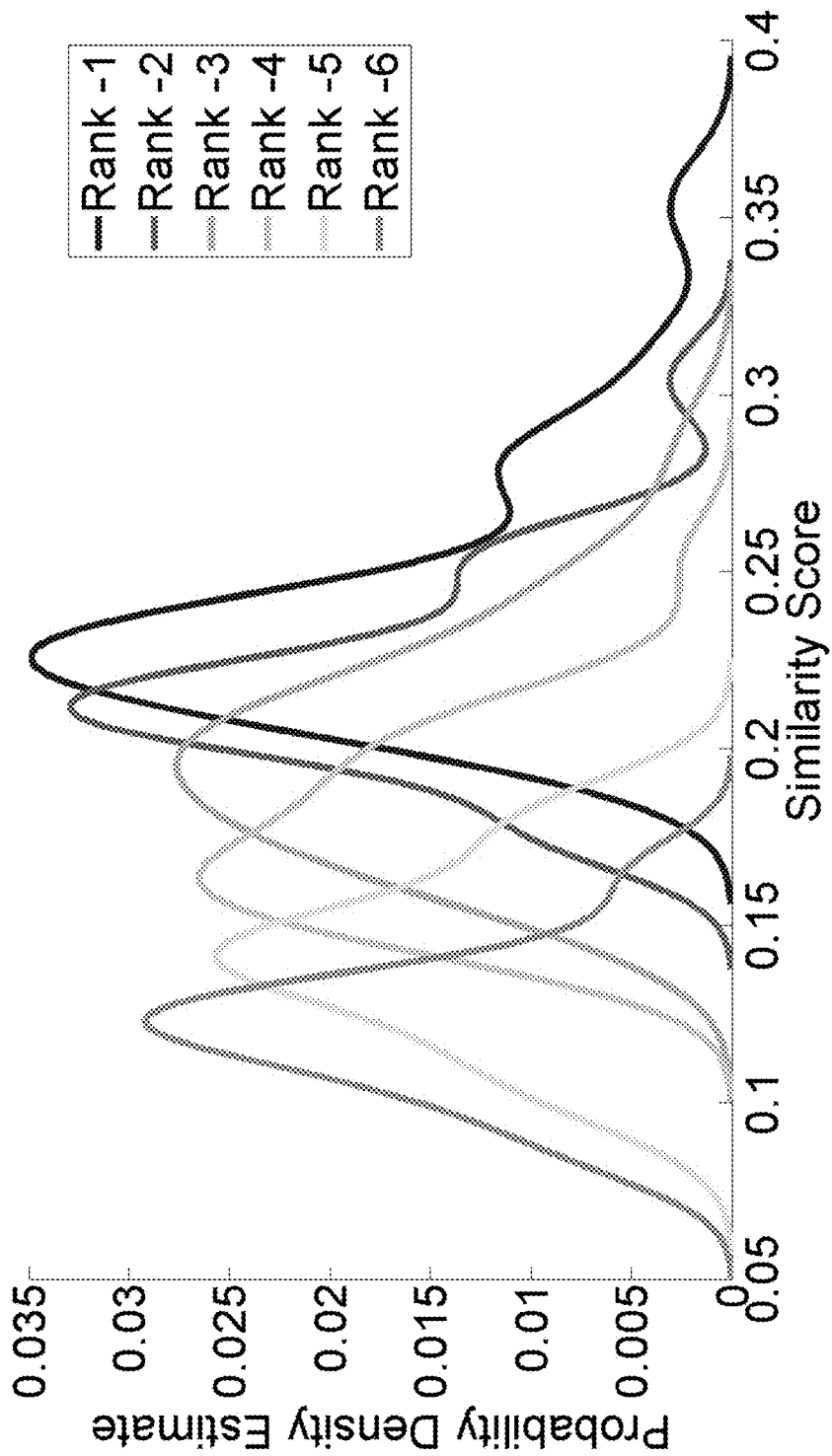
FIG. 8 depicts each curve depicts the probability density estimate corresponding to a C, subset; each subset C, was constructed by Step 1 of RBSN using the set $S^p$ for a random probe p.

We now demonstrate that the ordering of the densities in FIG. 8 is imposed by the rank-based construction of the subsets $C_r$. By construction we have that $$S_{x,i}^p \geq S_{x,j}^p, \forall i \leq j \text{ and } \forall x \qquad (3)$$

Let $X_i$ and $X_j$ be the variables that correspond to $S_{x,i}^p$; and $S_{y,j}^p$ (i.e., $C_i$ and $C_j$), respectively. As demonstrated by Hadar and Russell[13] this condition is sufficient to conclude that $X_i \geq_{FSD} X_j$. Given the relevant results from section II.3.1 it is clear that the densities $P_{X_i}$ and $P_{X_{ij}}$ are ordered if i≠j.

Step 2—Normalize Each Subset $C_r$

The set $S^{p;N}$ is initially and it is gradually updated by adding normalized scores to it. Specifically, the scores for a given subset $C_r$ are normalized independently of the other subsets and then added to $S^{p,N}$. This procedure is repeated until the scores of all the subsets $C_r$ have been normalized and added to $S^{p,N}$.

1) Key Remarks

First, we elaborate on when and why RBSN yields increased performance. Under the multimodal scenario a set of scores is obtained from each modality. Since each set is obtained by a different classifier the corresponding score distributions are heterogeneous. Therefore, a score normalization step that maps the scores for each set into a common domain is usually employed. Then, the normalized scores are combined in order to increase the systems' performance[2-3]. The obtained subsets from Step 1 include by construction at most one score per gallery subject and their distributions are also ordered. Using exactly the same arguments made in previous works for the multimodal case, it is expected that our approach results in increased performance. After all, since we do not normalize scores from different modalities together there is no good reason to do so under the unimodal scenario. In particular, the main strength of our approach compared to the raw implementation of score normalization techniques is that it exploits more information on a per probe basis. Consequently, it is expected to primarily increase the separation between match and non-match scores for each probe independently. However, as in the case of multimodal systems, an improved overall performance cannot always be guaranteed when our framework is employed. For instance, increased separation between the match and non-match scores for a single probe (i.e., better rank-1 accuracy) might come at the cost of a decreased separation between the match and nonmatch scores across probes and vice versa. In addition, an important limitation of our rank-based approach is that we cannot make any inferences concerning the score distributions of the subsets $C_r$. Even if the set of scores for a given probe is known to follow a certain distribution, the resulting subsets might follow a different, unknown distribution. Nevertheless, our experiments indicate that RBSN yields increased performance in practice. Moreover, the use of the non-parametric W-score normalization is now feasible as the constructed subsets $C_r$ include at most one score per subject.

2) Implementation Details

We note that score ties may be broken arbitrarily when computing the corresponding ranks since they do not affect the final outcome. Also, both ranking the scores for each gallery subject and normalizing the scores of each subset Cr may be implemented in parallel. Hence, our framework is quite scalable. Moreover, we note that galleries with different numbers of samples per subject result in subsets with different number of elements (see FIG. 8). Consequently, it is possible to obtain a subset which has few elements, and therefore a score normalization technique should not be applied. This is likely to happen for low rank subsets. In such cases, we may substitute such scores in many ways (e.g., use the corresponding normalized score we would obtain if RBSN was not used). For the purposes herein, we replace such scores with Not a Number (NaN) and we do not consider them at a decision level. Finally, we note that sometimes it is better to first integrate scores before we normalize them, while in other cases it is not. The intuition behind this is that in some cases the integrated scores are of a better quality, and thus the score normalization may be more effective. By integrating the scores on the other hand we might reduce and degrade the quality of the available information. In such cases, it is usually better to normalize the scores before we integrate them. In summary, the final performance depends on a combination of factors such as the quality of the scores at hand, the score normalization technique, the fusion rule, and the order that they are applied. However, there is not an analytical rule that indicates in which cases it is better to integrate scores before we normalize them or vice versa. Since our framework exploits information from multiple samples per subject, herein we always normalize the scores before we integrate them.

II.3.3 Rank-Based Score Normalization Aided by Gallery-Based Information

In this section, we present the Rank-based Score Normalization aided by Gallery-based Information (GRBSN) that exploits the gallery versus gallery match scores. Specifically, we compare the gallery against itself and organize the obtained scores using a symmetric matrix G. Each element $g_{i,j}$ corresponds to the matching score obtained by comparing the $i^{th}$ and $j^{th}$ samples of the gallery. We summarize the present approach in Algorithm II.2 below. The additional notation to be used is as follows:

G: the gallery versus gallery match scores matrix
$g_{i,j}$: the matching score obtained by comparing the $i^{th}$ and the $j^{th}$ elements of the gallery, $g_{i,j} \in G$
n: the number of columns in G
$S^{p;N}$: the set of normalized scores $S^p$
h: a given integration rule
t: a given threshold By construction, there is a correspondence between G and $S^p$. That is, the $i^{th}$ row/column of G refers to the same gallery sample as the $i^{th}$ score of $S^p$.

Algorithm II.2 Rank-based Score Normalization
aided by Gallery-based Information 1: procedure GRBSN(G, $S^p = \cup_i \{S_i^p\}$, f, h, t)
2:     if max(h(RBSN($S^p$, f))) ≥ t then
        Case 1: Probe is part of the Gallery
        Step 1.1: Augment G Algorithm II.2 Rank-based Score Normalization
aided by Gallery-based Information 3:         $\{g_{·,n+1}\} = S^p$              ▷n → n + 1
        Step 1.2: Normalize the Augmented G
4:         Associate the $n^{th}$ column of G with the gallery identity that
           corresponds to the Rank - 1 score of h(RBSN($S^p$, f))
5:         for i = 1 : |$g_{·,1}$| do
6:             $\{g_{i,·}\}$ = RBSN($g_{i,·}$, f)
7:         end for
        Step 1.3: Compute $S^{p;N}$
8:         $S^{p;N}$ = h(RBSN($S^p$, f), $g_{·,n}$)
9:     else
        Case 2: Probe is not part of the Gallery
        Step 2.1: Compute $S^{p;N}$
10:        $S^{p;N}$ = RBSN($S^p$; f)
11:    end if
12:    return $S^{p;N}$
13: end procedure Case 1—Probe is Part of the Gallery The RBSN algorithm or computer procedure is employed to normalize the scores by using a given score normalization technique f. Then an integration rule h is applied to the obtained normalized scores. If the maximum score is above a given threshold t (i.e., max(h(RBSN($S^p$,f)))≥t) then the probe believed to be part of the gallery set.

Step 1.1—Augment G

One more column is added to G that is comprised of the scores in $S^p$.

Step 1.2—Normalize the Augmented G

Each row of the augmented matrix G is treated independently and normalized using RBSN. The probe p is unlabeled and thus the last score of each row of G is not associated with any identity. To address this problem, the Rank-1 score of h(RBSN($S^p$; f)) is used to label the scores of the last column of the augmented matrix G. Normalizing each row of G using RBSN is thus feasible and the row-wise normalized matrix G is obtained.

Step 1.3—Compute $S^{p;N}$

The last column of the augmented matrix G contains the Gallery-specific normalized scores that correspond to the probe p. The RBSN($S^p$; f) corresponds to the Probe-specific normalized scores for the same probe p. Hence, the two vectors are combined using the relevant rule h.

Case 2—Probe is not Part of the Gallery

If the maximum score obtained from h(RBSN($S^p$,f)) as in Case 1 is not higher than the given threshold t, then the probe is not believed to be part of the gallery. Consequently, the Gallery-based information cannot be exploited using RBSN.

Step 2.1—Compute $S^{p;N}$

The gallery-based information is not used and the scores are normalized by employing the RBSN algorithm or computer procedure.

1) Key Remarks

First, we now detail on why GRBSN is expected to produce better normalized scores. Each score in $S^p$ is normalized in relation to: (i) scores in $S^p$, and (ii) scores contained in each row of G (see FIG. 7). Thus, we obtain both Probe-specific and Gallery-specific normalized scores exploiting each time a different source of information. Combining the two scores is reasonable, as the same rules are suitable when combining evidence for multiple measurements[3]. The combined scores may then be integrated using any integration rule as usual.

2) Implementation Details

We note that the implementation presented in Algorithm II.2 and shown in FIG. 7 increases the readability of the present disclosure and helps the reader understand the present approach. In practice, an optimized version may be employed to speed up the processing time. For example, each time that RBSN is applied in Step 1.2 only the subset $C_r$ that corresponds to the score of the last column of G needs to be normalized. Moreover, the normalization of each row of the augmented matrix G in Step 1.2 may be implemented in parallel, and thus GRBSN may scale up well. A major limitation of this method though is the estimation of the probe's identity (i.e., Step 1.2). We may overcome this problem by ignoring the identity estimation (i.e., lines 2, 4, 9 & 10). That is, the Gallery-based information is still exploited by normalizing the scores using the normalization technique f, but without implementing RBSN in: (i) Step 1.2, or (ii) Step 1.2 and Step 1.3. The former approach though might produce normalized scores, which are not homogeneous and thus induce noise. This heteroskedasticity is attributed to the fact that the Gallery-specific scores are normalized in sets of size n+1. The Probe-specific scores on the other hand are partitioned and normalized in sets of size |I| or smaller. Consequently, there is a mismatch in the amount of information used in the two cases. The later approach is expected to produce normalized scores of a lower quality since we do not exploit the benefits of RBSN. For these reasons, we adopt the implementation described in Algorithm II.2, which both exploits the benefits of RBSN and normalizes scores organized in subsets of similar sizes. Moreover, the threshold value of Algorithm II.2 may be selected based on the prior information. A high threshold will contribute to robust estimates by GRBSN because the identity estimation will be correct in most cases. However, the improvements over RBSN most likely will not be significant due to the small number of cases that the Gallery-based information is actually used. On the other hand, using a low threshold value might assign incorrect identities to the probes, and hence would induce noise that might degrade the system's performance. An analytical rule that provides a good tradeoff cannot be found since the final performance depends on the data at hand along with the score normalization and fusion techniques employed.

II.3.4 Online Rank-Based Score Normalization

In this section, we build upon the GRBSN algorithm or computer procedure and present an online version of the present framework (ORBSN). This approach uses information from probes that have been submitted to the system to dynamically augment the gallery. We provide an overview of the Online Rank-based Score Normalization in Algorithm II.3 below. As in Section II.3.3, we make use of information from the gallery versus gallery matching scores. The additional notation to be used is as follows:

G: the set of biometric samples in the gallery
P: the set of probes presented to the system
S: the set of scores for all probes, $\cup_p S^p = S$
$S^N$: the set of normalized scores S
t: a given threshold ---
Algorithm II.3 - Online Rank-based Score Normalization
---
1: procedure ORBSN(G, G, S = $\cup_p \{S^p\}$, f, h, t)
2:    for all p = 1 : |P| do
     Step 1: Apply GRBSN
3:       $S^{p,N}$ = GRBSN(G, $S^p$, f, h, t)
     Step 2: Augment G and Re-compute G
4:       if max(h($S^{p,N}$)) ≥ t then
5:         G = G ∪ p     ▷ incorporate probe p
6:         Re-compute the gallery versus gallery similarity scores using the augmented gallery set G ---
Algorithm II.3 - Online Rank-based Score Normalization (-continued)
---
7:       end if
8:    end for
9:    return [$S^N = \cup_p \{S^{p,N}\}$, G]
10: end procedure Step 1—Apply GRBSN In this step, GRBSN is applied using the corresponding inputs.

Step 2—Augment G and Re-Compute G

If the probe is believed to be part of the gallery set by some rule (e.g., max(h($S^{p,N}$))≥t), then p is incorporated into G. Based on the new set of biometric samples in G the matrix G is updated by re-computing the gallery versus gallery matching scores. When a new probe is submitted to the system it will be compared against the augmented gallery G and the corresponding matrix G.

1) Key Remarks

The intuition of ORBSN is very similar with the idea presented in section II.3.3 in the sense that we apply both Probe-specific and Gallery-specific normalization. When the system is confident concerning the identity of a submitted probe the corresponding biometric sample is incorporated to the gallery. As a result, the available information is updated in two ways: (i) new probes are compared against an augmented gallery, and (ii) the gallery-based information exploited by GRBSN is also enhanced. Hence, the present framework may be applied to single-sample galleries as previously submitted probes may be used to increase the number of samples per gallery subject.

2) Implementation Details

An implicit assumption of ORBSN is that some of the submitted probes will be part of the gallery because otherwise G would never be updated. In addition, we note that each time that the gallery is updated we need to compare the next submitted probe with an additional biometric sample. Even worse, each row of G now contains an extra score to be considered when the Gallery-specific normalization is employed. This increases the computational complexity of the system. One possible solution to this problem would be to impose an upper bound on the number of samples per gallery subject. In addition, a rule concerning the most informative subset of biometric samples per gallery subject could be used to determine which samples will be included in G. However, a general solution to this problem does not currently exist. On the bright side, G does not have to be re-computed at each iteration since the matching scores have already been computed. Finally, even though ORBSN and GRBSN share many characteristics different thresholds could be used in Step 1 and Step 2. Intuitively, the threshold used to augment G should have a higher value since any mistakes are going to be propagated.

II.4. Experimental Evaluation

In this section, we present the: (i) the data sets—II.4.1, (ii) evaluation measures—II.4.2, (iii) general implementation details—II.4.3, and (iv) experimental results—II.4.4.

II.4.1 Databases

UHDB11

The data in UHDB11[7] have been acquired from 23 subjects under six illumination conditions. For each illumination condition, the subject was asked to face four different points inside the room. This generated rotations on the Y axis. For each rotation on Y, three images were also acquired with rotations on the Z axis (assuming that the Z axis goes from the back of the head to the nose, and that the Y axis is the vertical axis through the subject's head). Thus, images under six illumination conditions, four Y rotations and three Z rotations per subject were acquired. In total, this database includes 72 pose/light variations per subject for 23 subjects. Hence, as many as 2,742,336 pairwise comparisons may be formed. Each sample includes both 2D image captured using a Canon™ DSLR camera and a 3D mesh captured by 3dMD™ 2-pod optical 3D system. The scores used in the experiments for UHDB11 were provided by Toderici et al.[14]

FRGC v2

This database includes 4,007 biometric samples obtained from 466 subjects under different facial expressions. The method of Ocequeda et al.[15] was employed in order to extract signatures from the 3D meshes. The Bosphorus database[16] was used a training set because according to the first part of this application it yields the best performance when a single training set is used. To compute the Euclidean distance for the 16,056,049 pairwise combinations of the available samples 27 basis function were used. Finally, the obtained distances were transformed into scores by using the formula score=max(distance)−distance. This way, the scaling of the score distribution is not altered and all the scores lie in the interval [0, max(distance)]. We note that even though this database provides numerous scores for experimental evaluation it consists of 3D data. Consequently, distortions such as pose and lighting conditions do not affect the performance of the system and the score distributions are therefore homogeneous in general. This is evident by the high performance reported in the first part of the application using raw scores (i.e., verification rate greater than 97% at a false acceptance rate of $10^{-3}$ for the Experiments II.1-3).

II.4.2 Performance Measures

To provide an overview of the system's performance for the Open-set Identification task the osi-ROC is used that compares the Detection and Identification Rate (DIR) against the False Alarm Rate (FAR) to provide an overview of the system's performance for the Open-set Identification task[17]. For the same task we also use the Open-set Identification Error (OSI-E). That is, the rate at which the max score for a probe corresponds to an incorrect identity given that the subject depicted in the probe is part of the gallery[1]. Specifically, the OSI-E is inversely proportional to the percentage of correct classifications based on the rank−1 scores for probes in the gallery, a metric that is usually reported for the closed-set identification task. To assess the Verification performance and the separation of match and non-match scores the ROC that compares Verification Rate (VR) against the False Acceptance Rate (FAR) is used. Different methods result in FARs with different ranges. Hence, quantities such as Area Under the Curve (AUC) and max-DIR are not directly comparable. Therefore, a common FAR range is selected by setting the universal lower and upper bound to be equal to the infimum and supremum, respectively. That is, the universal upper bound is defined to be the minimum of the maximum FAR values obtained for a set of curves to be compared. This FAR adjustment is performed per recognition task (i.e., Openset Identification and Verification) and per integration rule (i.e., sum and max) for each experiment. Finally, we denote by ΔAUC the relative improvement of the raw scores performance (e.g., $\Delta AUC=(AUC_{RBSN}-AUC_{raw})/AUC_{raw}$).

II.4.3 General Implementation Details

For the Verification task we assume that each probe is compared to all the gallery subjects, one at a time. We further assume that the rest of the subjects may be used as cohort information. Although the experimental protocol employed is an unlikely scenario, it provides rich information for evaluating the performance of the present framework under a Verification setting. The W-score normalization was implemented by selecting five scores each time to fit a Weibull distribution. This number of scores has been empirically found to be sufficient[8]. Using five scores for fitting however sometimes yields discretized normalized scores. Results for which the corresponding FAR range is less than $10^{-1}$ are omitted. In addition, W-score is not directly applicable to multi-sample galleries, and thus, the corresponding results are omitted as well. Subsets C, that included less that 10 scores and/or had a standard deviation less than $10^{-5}$ were not normalized. The reason is that in such cases the available information is not rich enough. The corresponding values were replaced by NaN. The notation RBSN:Z-score is used to indicate that Z-score normalization has been used as an input to Algorithm II.1. For GRBSN and ORBSN, results are reported based on: (i) optimal identity estimation (i.e., $GRBSN:Zscore_o$), (ii) pessimal identity estimation (e.g., $GRBSN:Zscore_p$), (iii) threshold t. (e.g., $GRBSN: Zscore_{t_i}$), and (iv) our previous work as a baseline (i.e., $GRBSN:Zscore_b$). In order to specify the threshold values $t_i$, we used the matrix G. That is, we normalized G using RBSN. The value that results in the minimum non-zero FAR under an Open-set Identification task was used as the first threshold (i.e., $t_1$). The second threshold $t_2$ was defined as the value that yields an FAR value 100 times higher than the minimum non-zero FAR which was used for computing $t_1$. We also note that the user may employ different fusion rules at different steps in GRBSN and ORBSN. In our experience, the max rule yields better rank−1 classification, while the sum rule results in less discretized scores, which is better when the point of interest is the separation of the match and non-match scores. Therefore, we have used the max rule when needed to estimate the probe's identity and the sum rule to combine scores in the corresponding computer procedures or algorithms. For the integration task results are provided for both rules as indicated in the tables with the relevant results. To assess the performance of ORBSN, a Leave-One-Out approach was adopted. Each time we assumed that |P|−1 probes have been submitted to the system and a decision has to be made for the remaining one. The system uses a threshold to select a subset of the |P|−1 probes for which it is confident concerning the estimated identity. Then, the corresponding samples are incorporated to the gallery G and ORBSN is implemented as in Algorithm II.3. While this approach does not track the improvement over time, it provides deterministic results and avoids randomization errors (i.e., ordering of the submitted probes). The matrix G contains only units in the diagonal. We replaced these values with NaN in order to avoid distortions when estimating the necessary parameters (e.g., mean value in Z-score).

II.4.4 Experimental Results

Experiment II.1

Figure 9:
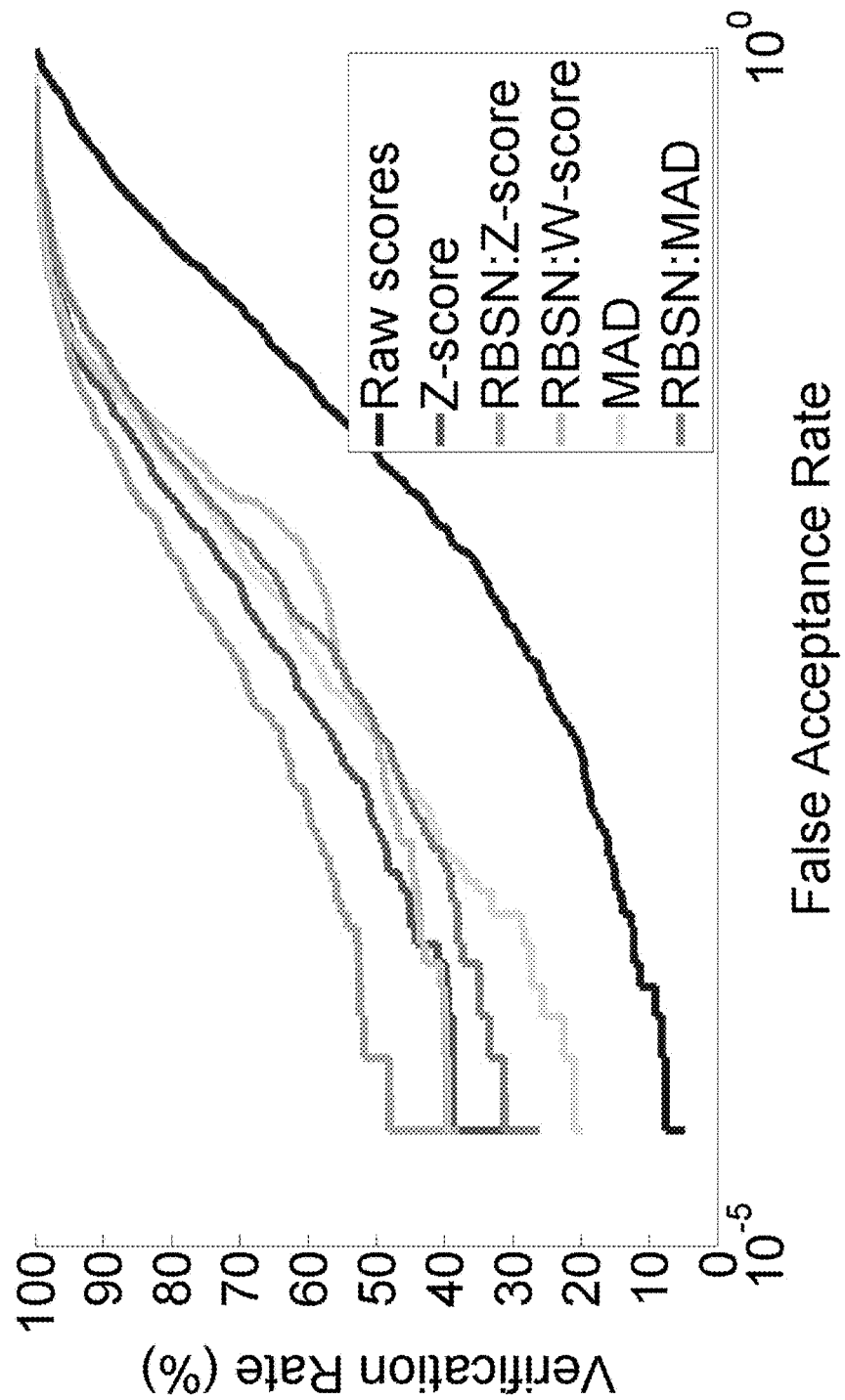
FIG. 9 depicts the ROC curves of the Experiment II.1 for UHDB11 when the sum rule is used for: (i) Raw Scores, (ii) Z-score, (iii) RBSN:Z-score, (iv) W-score, (v) MAD, and (vi)

The objective of this experiment are to assess: (i) the performance of RBSN for both Open-set Identification and Verification tasks; (ii) the effect of RBSN on the match and non-match scores separation on a per probe basis, and (iii) the effect of different illumination conditions. For UHDB11, we used six samples per subject to form a gallery, one for each illumination condition. As a result, random effects between the gallery subjects (samples) due to lighting conditions were eliminated. Five, six and ten match scores are reported in the prior art[18-20]. Our gallery for this experiment comprised of 138 samples and the remaining 1,486 samples were used as probes. Even though this design yields a closed-set problem reporting results for the Openset Identification task remains relevant. The reason is that the overlap of the match and non-match score distributions for Open-set Identification is higher compared to that obtained for Verification et. al'. To form the gallery for FRGC v2 1,893 samples from 350 subjects were randomly selected. The remaining 2,114 samples obtained from 302 subjects are used as probes. Note that this experimental protocol yields an open-set problem. The results of this experiment are summarized in Table II.1 and partial results are depicted in FIG. 9.

score vs. Z-score: $6.8 \times 10^{-240}$ (iii) RBSN:W-score vs. Raw Scores: $9.5 \times 10^{-240}$, (iv) AD vs. Raw Scores: 1, and (v) RBSN:MAD Vs. MAD: $4.8 \times 10^{240}$. The corresponding p-values for FRGC v2 are: (i) Z-score vs. Raw Scores: 1, (ii) RBSN:Z-score vs. Z-score: $2.8 \times 10^{-36}$ (iii) RBSN:Wscore vs. Raw Scores: 2.1×10-21, (iv) MAD vs. Raw Scores: 1, and (v) RBSN:MAD vs. MAD: $8.1 \times 10^{-31}$. The test W-score vs. Raw Scores cannot be performed because W-score is not applicable to multi-sample galleries. These results indicate that the separation of match and non-match scores for each probe significantly increases when RBSN is used (i.e., $H_0$ is

TABLE II.2

Summary of the results from Experiment 1

| | Sum Rule | | | | Max Rule | | | |
|---|---|---|---|---|---|---|---|---|
| | Open-set Identification | | | Verification | Open-set Identification | | | Verification |
| Method | OSI-E (%) | max-DIR (%) | osi-ΔAUC | vr-ΔAUC | OSI-E (%) | max-DIR (%) | osi-ΔAUC | vr-ΔAUC |
| | | | | UHDB11 | | | | |
| BI | 28.73 | 71.20 | 92.76 | 93.05 | 28.73 | 71.20 | 95.27 | 91.11 |
| Z-score e | 13.53 | 86.41 | 267.69 | 165.69 | 10.43 | 86.41 | 259.77 | 173.69 |
| RBSN:Z-score | 16.35 | 81.70 | 297.04 | 179.19 | 10.50 | 81.70 | 280.00 | 181.11 |
| RBSN:W-score | 24.23 | 58.75 | 194.32 | 158.08 | 27.99 | NaN | NaN | 87.00 |
| MAD | 13.53 | 86.41 | 260.87 | 151.01 | 10.43 | 86.41 | 222.57 | 152.44 |
| RBSN:MAD | 14.94 | 84.52 | 277.15 | 155.03 | 13.53 | 84.52 | 138.44 | 133.82 |
| | | | | FRGC v2 | | | | |
| Z-score | 0.74 | 99.26 | 100.94 | 93.82 | 0.30 | 99.71 | 83.47 | 90.53 |
| RBSN:Z-score | 0.66 | 99.34 | 100.03 | 95.13 | 0.22 | 99.71 | 82.54 | 90.49 |
| RBSN:W-score | 3.62 | 96.01 | 94.32 | 69.37 | 2.73 | NaN | NaN | 52.69 |
| MAD | 0.74 | 99.26 | 100.58 | 82.06 | 0.30 | 99.70 | 68.99 | 84.55 |
| RBSN:MAD | 0.66 | 99.34 | 101.37 | 83.90 | 0.22 | 99.78 | 65.33 | 83.89 |

For the more general AUC indexes, RBSN appears to increase the performance in 9/16 cases. For the more specific OSI-E and max-DIR measures RBSN appears to yield increased performance in 7/15 cases. In summary, no general conclusions can be drawn about whether RBSN increases the overall performance or not. The performance of RBSN appears to yield better results for FRGCv2 compared to UHDB11. One possible explanation is that the number of scores per subset Cr is about 23 for UHDB11 and 350 for FRGC v2. Therefore, partitioning the scores for UHDB11 results in small subsets which are sensitive to noise. Finally, the ΔAUC values for FRGC v2 are always below 100 which means that the score normalization degrades the performance of the raw scores. This is due to the fact that the biometric samples are all 3D and thus distortion-free. A more detailed analysis is provided in Experiment II.4.

To investigate whether RBSN increases the separation of the match and non-match scores for a given probe we performed statistical hypothesis testing. In particular, for each probe the ROC curves and the corresponding AUCs were computed. The AUC values were used to perform non-parametric Wilcoxon Signed-Rank tests[21]. The null hypothesis was set to $H_0$: the RBSN and raw median AUCs are equal, and the alternative to Ha: the RBSN median AUC is larger than the raw median AUC. The Bonferonni correction was used to ensure that the overall statistical significance level (i.e., α=5%) is not overestimated due to the multiple test performed. That is, the statistical significance of each individual test was set to α/m, where m is the number of test performed. The obtained p-values for UHDB11 are: (i) Z-score vs. Raw Scores: 1, (ii) RBSN:Z- rejected). However, this is not the case for Z-score or MAD which are linear transformations and yield identical AUC values to the raw scores. As pointed out in Section II.3, while the separation of the match and non-match scores for each probe significantly improves when RBSN is employed it does not always imply a better performance overall.

To systematically assess the effects of different illumination conditions the UHDB11 database was used. In particular, one gallery sample was selected at a time obtained under the same illuminations condition. Then, the performance of the corresponding raw scores was computed. For each of the evaluation measures the illumination condition that resulted in the best performance across probes was retained. The corresponding results are presented in Table II.1 for the method denoted by BI (i.e., best illumination). For the OSI-E and max-DER measures BI is compared to Z-score as the latter is equivalent to the raw scores performance. In all cases, using six samples per gallery samples yields better performance than BI. Similarly, both osi- and vr-ΔAUC values for BI are below the ones obtained for the raw scores. We conclude that using multiple samples per gallery subject under various illumination conditions helps the system to address the challenge posed by different lighting conditions in the probes. However, the RBSN score normalization exploits the existing information in a better way and increases the performance even further.

Experiment II.2

Figure 10:
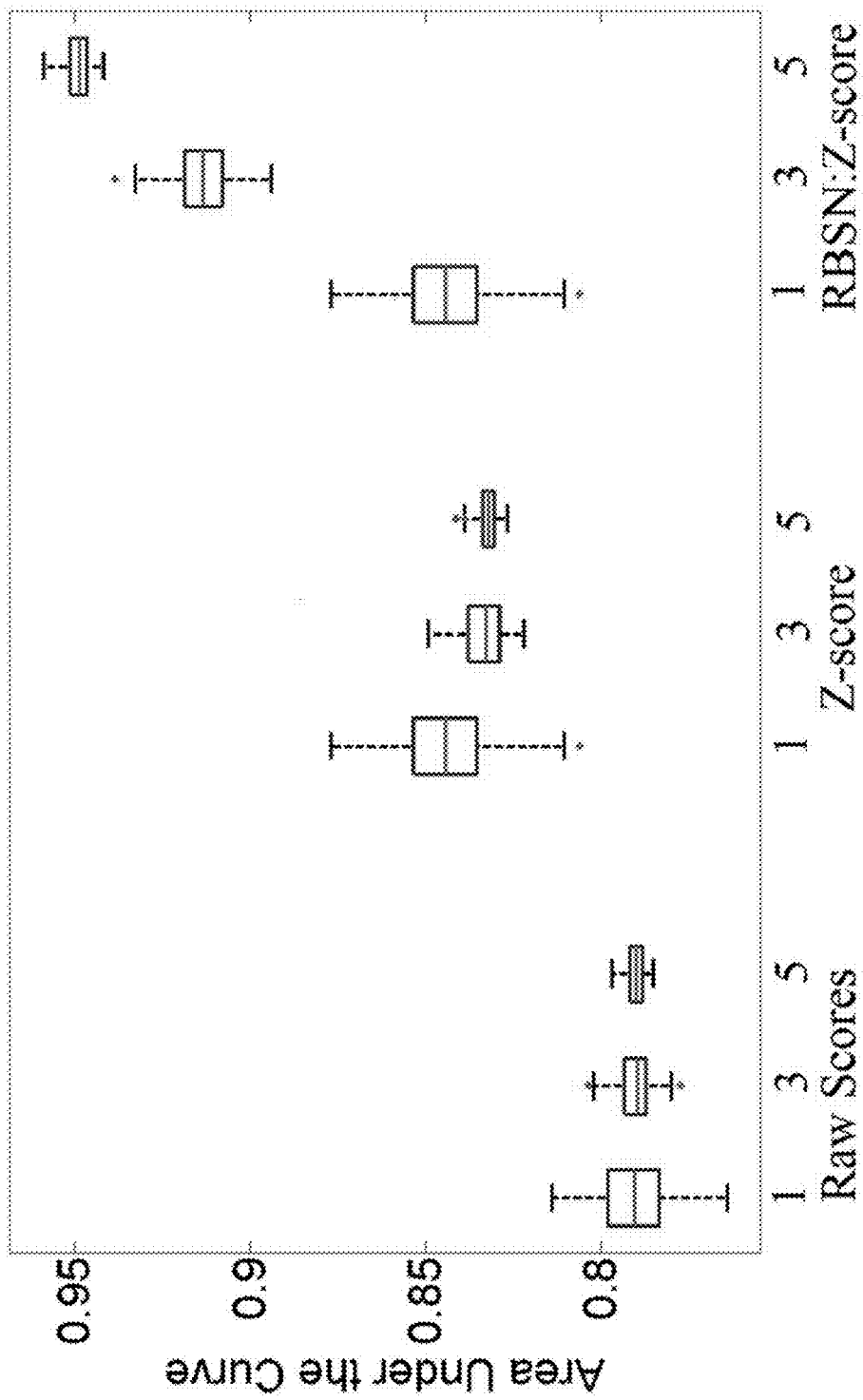
FIG. 10 depicts the boxplots for: (i) Raw Scores, (ii) Zscore and (iii) RBSN:Z-score, when one, three and five samples per gallery subject are randomly selected from UHDB11.

The objective of this experiment is to assess the effect that different number of samples per gallery subject has to the performance of RBSN. To this end, we randomly select one, three, and five number of samples per subject of the galleries defined in Experiment II.1 and computed the ROC curves and the corresponding AUC values. This procedure is repeated 100 times and the obtained values for Z-score are depicted in the corresponding boxplots shown in FIG. 10 for UHDB11. For the statistical evaluation of these results we used the non-parametric Mann-Whitney U test. Specifically, the null hypothesis assumes that the median values are equal when three and five samples are used while the alternative assumes that the median AUC value is increased when five samples are used rather than three samples. The obtained p-values for UHDB11 are: (i) Raw Scores: 0.9, (ii) Z-score: 0.8, (iii) RBSN:Z-score: $1.3 \times 10^{-34}$, (iv) RBSN:W-score: $1.3 \times 10^{-34}$ (v) MAD: 0.14, and (vi) RBSN:MAD: $1.3 \times 10^{-34}$. The obtained p-values for FRGC v2 are: (i) Raw Scores: 1, (ii) Z-score: 0.5, (iii) RBSN:Z-score: 0.3, (iv) RBSN:W-score: 0.3, (v) MAD: 0.9, and (vi) RBSN:MAD: 0.6. For UHDB11 the null hypothesis is rejected only when RBSN is employed. and the minimum possible p-value is obtained. While for FRGC v2 the null hypothesis is not rejected in any case, we notice that the obtained p-values are smaller when are our framework is employed. Therefore, we have strong statistical indications that score normalization techniques benefit more by an increase in the number of samples per gallery subject if they are used in conjunction with our approach.

Experiment II.3

Figure 11:
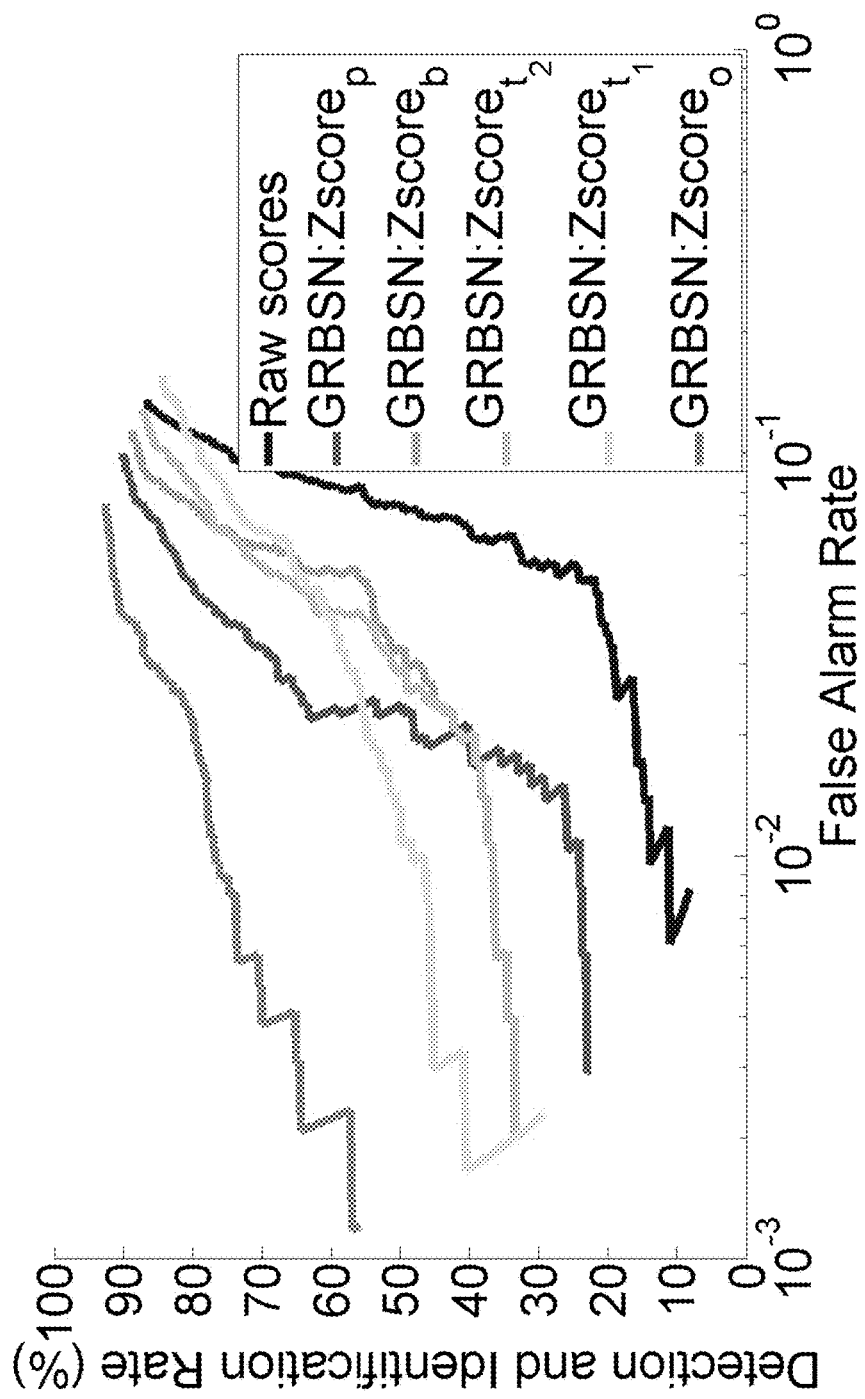
FIG. 11 depicts the osi-ROC curves of the Experiment 3 for UHDB11 when the sum rule is used for: (i) Raw Scores, (ii) GRBSN:Z-score$_p$, (iii) GRBSN:Z-score$_b$, (iv) GRBSN:Z-score$_{t_2}$, (v) GRBSN: Z-score$_{t_1}$, and (vi) GRBSN:Z-score$_o$.

The objectives of this experiment are to assess: (i) the improvements obtained over RBSN by exploiting gallery-based information, and (ii) the performance of the different versions of GRBSN for the Open-set Identification and Verification tasks. The gallery and probe sets were defined in the same way as in Experiment ILL Therefore, the results of Experiments II.1 and Experiment II.3 are directly comparable. An overview of the GRBSN performance is presented in Tables II.3 and Table II.3 and partial results are depicted in FIG. 11.

TABLE II.2

Summary of the results from Experiment 3

| | Sum Rule | | | | Max Rule | | | |
|---|---|---|---|---|---|---|---|---|
| | Open-set Identification | | | | Open-set Identification | | | |
| Method | OSI-E (%) | max-DIR (%) | osi-ΔAUC | Verification vr-ΔAUC | OSI-E (%) | max-DIR (%) | osi-ΔAUC | Verification vr-ΔAUC |
| UHDB11 | | | | | | | | |
| GRBSN:Z-score$_p$ | 9.96 | 87.21 | 323.51 | 157.03 | 11.78 | 81.43 | 205.61 | 156.35 |
| GRBSN:Z-score$_b$ | 11.37 | 79.81 | 343.36 | 167.56 | 9.29 | 87.75 | 266.35 | 167.89 |
| GRBSN:Z-score$_{t2}$ | 12.79 | 77.66 | 348.19 | 168.04 | 11.10 | 86.99 | 264.98 | 165.85 |
| GRBSN:Z-score$_{t1}$ | 15.61 | 74.16 | 412.50 | 173.60 | 10.63 | 86.14 | 357.41 | 173.03 |
| GRBSN:Z-score$_o$ | 7.47 | 92.46 | 693.09 | 193.60 | 6.93 | 93.00 | 296.64 | 172.04 |
| GRBSN:W-score$_p$ | 16.35 | 56.26 | 15.63 | 121.40 | 16.35 | 56.26 | 15.63 | 121.40 |
| GRBSN:W-score$_b$ | 17.97 | 44.41 | 107.79 | 138.87 | 17.97 | 44.41 | 107.79 | 138.87 |
| GRBSN:W-score$_{t2}$ | 17.50 | 34.79 | 101.38 | 137.94 | 17.50 | 34.79 | 101.38 | 137.94 |
| GRBSN:W-score$_{t1}$ | 19.04 | 35.26 | 103.94 | 137.59 | 19.04 | 35.26 | 103.94 | 137.59 |
| GRBSN:W-score$_o$ | 9.96 | 89.97 | 326.67 | 159.82 | 9.96 | 89.97 | 326.67 | 159.82 |
| GRBSN:MAD$_p$ | 13.66 | 81.63 | 272.29 | 152.19 | 48.86 | 5.79 | 9.03 | 79.56 |
| GRBSN:MAD$_b$ | 12.72 | 82.57 | 298.54 | 155.24 | 44.21 | 5.65 | 6.09 | 82.07 |
| GRBSN:MAD$_{t2}$ | 14.60 | 78.73 | 286.46 | 151.16 | 42.33 | 4.37 | 4.01 | 79.68 |
| GRBSN:MAD$_{t1}$ | 14.94 | 78.60 | 351.79 | 156.30 | 15.07 | 76.45 | 34.13 | 109.25 |
| GRBSN:MAD$_o$ | 9.62 | 90.31 | 340.71 | 156.74 | 44.41 | 5.25 | 5.95 | 81.91 |
| FRGC v2 | | | | | | | | |
| GRBSN:Z-score$_p$ | 0.44 | 99.56 | 94.59 | 98.88 | 0.30 | 99.71 | 92.10 | 95.96 |
| GRBSN:Z-score$_b$ | 0.37 | 99.63 | 91.92 | 98.73 | 0.22 | 99.78 | 87.97 | 94.38 |
| GRBSN:Z-score$_{t2}$ | 0.52 | 99.48 | 91.10 | 98.39 | 0.22 | 99.78 | 87.42 | 94.09 |
| GRBSN:Z-score$_{t1}$ | 0.66 | 99.34 | 81.57 | 95.19 | 0.22 | 99.78 | 82.56 | 90.52 |
| GRBSN:Z-score$_o$ | 0.37 | 99.63 | 101.35 | 100.55 | 0.22 | 99.78 | 96.35 | 95.52 |
| GRBSN:W-score$_p$ | 0.81 | 99.19 | 88.26 | 85.27 | 0.22 | 99.70 | 97.10 | 77.89 |
| GRBSN:W-score$_b$ | 2.80 | 97.20 | 91.83 | 77.28 | 0.81 | 99.19 | 100.25 | 59.98 |
| GRBSN:W-score$_{t2}$ | 2.66 | 97.34 | 60.97 | 77.51 | 1.11 | 98.89 | 36.59 | 60.03 |
| GRBSN:W-score$_{t1}$ | 2.66 | 97.34 | 91.61 | 77.20 | 1.03 | 98.97 | 25.88 | 59.96 |
| GRBSN:W-score$_o$ | 2.07 | 97.93 | 100.18 | 100.96 | 0.15 | 99.85 | 101.89 | 97.90 |
| GRBSN:MAD$_p$ | 0.37 | 99.63 | 74.59 | 89.07 | 0.30 | 99.70 | 79.85 | 90.30 |
| GRBSN:MAD$_b$ | 0.37 | 99.63 | 74.25 | 88.89 | 0.30 | 99.70 | 78.93 | 89.01 |
| GRBSN:MAD$_{t2}$ | 0.66 | 99.34 | 74.39 | 88.69 | 0.22 | 99.79 | 79.10 | 88.74 |
| GRBSN:MAD$_{t1}$ | 0.66 | 99.34 | 62.50 | 84.03 | 0.22 | 99.79 | 65.36 | 84.50 |
| GRBSN:MAD$_o$ | 0.30 | 99.70 | 81.35 | 91.79 | 0.15 | 99.85 | 83.92 | 90.68 |

The OSI-E and max-DIR refer to absolute values, where for the latter the maximum DIR performance is reported. The osi-ΔAUC and vr-ΔAUC refer to the relative improvement of the raw scores performance, while the Sum and Max rules refer to the integration method employed. The relative experimental protocol is described in Section II.4.

TABLE II.3

Statistics for GRBSN Using Two Threshold

| UHDB11 | | # probes ≥ $t_j$ | # Correct Estimations |
|---|---|---|---|
| $t_1$ | GRBSN:Z-score | 806 | 806 |
| | GRBSN:W-score | 1,408 | 1,009 |
| | GRBSN:MAD | 145 | 145 |
| $t_2$ | GRBSN:Z-score | 1,363 | 1,278 |
| | GRBSN:W-score | 1,485 | 1,057 |
| | GRBSN:MAD | 1,257 | 1,154 |

TABLE II.3-continued

Statistics for GRBSN Using Two Threshold

| FRGC v2 | | # probes ≥ $t_i$ | # Correct Estimations |
|---|---|---|---|
| $t_1$ | GRBSN:Z-score | 64 | 64 |
| | GRBSN:W-score | 1,938 | 1,304 |
| | GRBSN:MAD | 180 | 180 |
| $t_2$ | GRBSN:Z-score | 1,266 | 1,233 |
| | GRBSN:W-score | 2,114 | 1,318 |
| | GRBSN:MADO | 1,118 | 1,087 |

In this table, we provide statistics about the number of times that the gallery-based information was used for GRBSN when the two threshold values were employed in Experiment II.3. Information concerning the correct number of identity estimations is also provided.

For UHDB11 discretized scores were obtained when the MAD score normalization and max rule were used. Similarly, W-score produced discretized scores for FRGC v2 for both rules. Therefore, the relevant results are provided but they are not taken under consideration in our analysis. For the optimal and pessimal conditions the gallery-based information was exploited for all probes. Across databases, the GRBSN under pessimal conditions outperforms RBSN in 16/35 cases, while under optimal conditions it outperforms RBSN in 31/35 cases. In 22/32 cases at least one of the $t_1$ or $t_2$ results in increased performance compared to RBSN. This evidence suggest that exploiting the gallery-based information can be beneficial.

For UHDB11 $t_2$ yields better results compared to t, in 9/20 cases. When it comes to FRGC v2 though $t_2$ yields better results compared to $t_1$ in all cases. The reason becomes clear by referring to Table II.3. The percentage of correct identity estimates for FRGC v2 is higher fort, but for $t_2$ the gallery-based information is exploited 1, 266+1, 118−64−180=2, 140 more times. For UHDB11 the percentage of correct identity estimates is significantly lower for $t_2$ and thus the additional information induces too much noise. The version of GRBSN based on our previous work outperforms the proposed approach for both thresholds 11/20 times for UHDB11 and 10/14 times for FRGC v2. This is attributed to the fact that FRGC v2 yields better rank−1 performance than UHDB11 (see Table II.2). Hence, by always using the gallery-based information the additional information benefits the system. Finally, in 8/20 cases for UHDB11 and in 12/16 cases for FRGC v2 the performance of the system under pessimal conditions is better compared to when the two threshold values are used. At the same time, in 19/20 cases for UHDB11 and in 11/12 cases for FRGC v2 the performance of the system under optimal conditions is significantly better compared to all the other approaches. In summary, we conclude that while a correct identity estimate is important it remains quite robust to incorrect identity estimates. This is supported by the good performance of the previous version of GRBSN and the obtained results under pessimal conditions.

Experiment II.4

Figure 12:
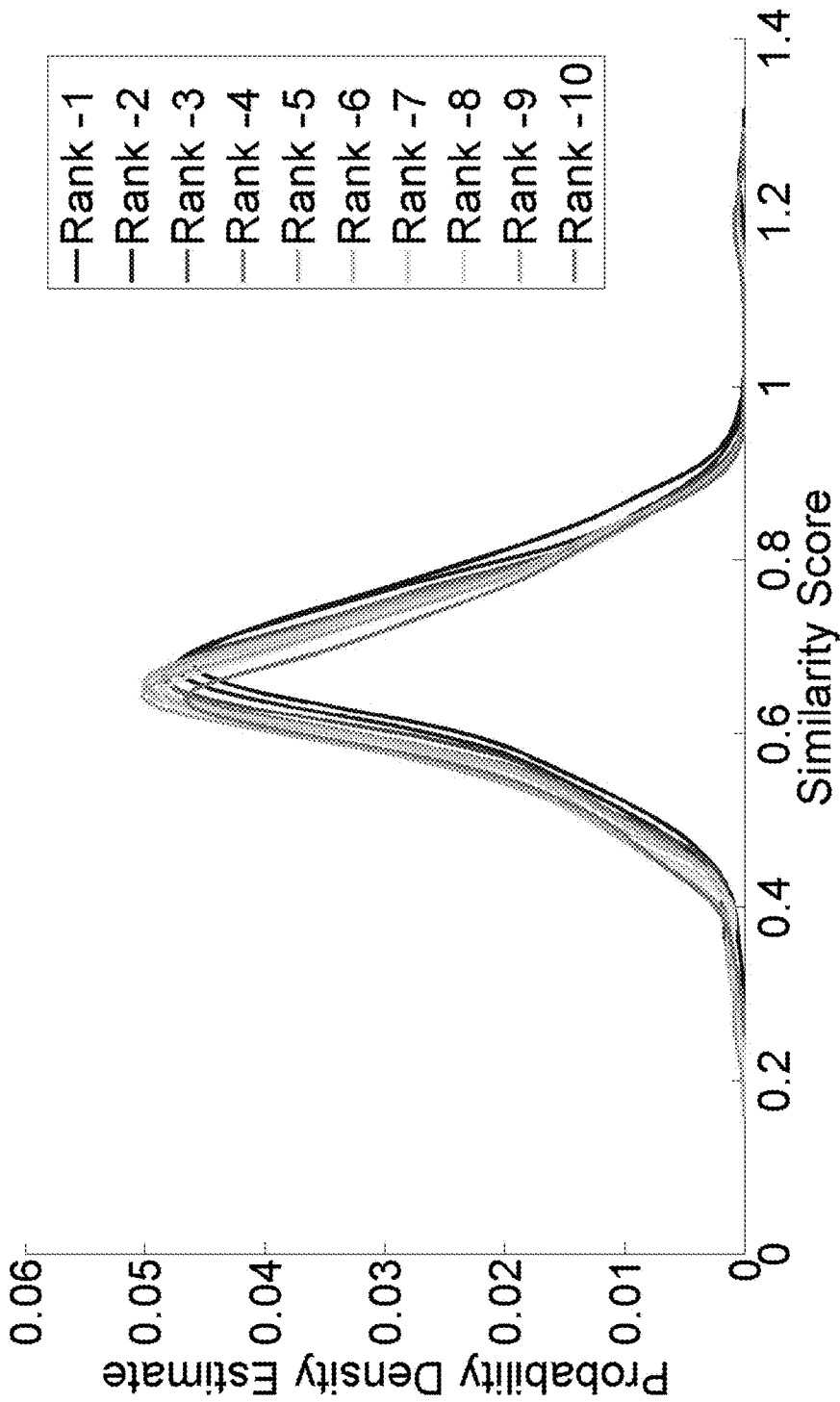
FIG. 12 depicts was constructed by the Step 1 of RBSN using the set $S^p$ for a random probe under the optimal scenario defined in Experiment II.4, i.e., the gallery set consists of 3,073 biometric samples labeled using the ground truth—only the first 10 ranks are depicted for illustrative reasons.

The objective of this experiment is to assess the performance of ORBSN for both Open-set Identification and Verification tasks using a single-sample gallery. We note that the gallery set in UHDB11 is comprised of both 3D and 2D data, while the probe set included of 2D data only. Hence, it is not possible to incorporate the probes into the gallery and then apply the same method to compute the corresponding match scores. As a result, for the purposes of this experiment we used only FRGC v2. Specifically, we selected randomly a single sample from 350 subjects. The rest of the 3,657 samples obtained from the 466 subjects are used as probes. For the pessimal scenario, we used the same probes as in the optimal but we enforced incorrect identity estimates. Moreover, since the matrix G of this experiment does not produce match scores from different samples of the same subjects we reused the thresholds $t_1$ and $t_2$ obtained in Experiment II.3. Since a single-sample gallery is available and a Leave-One-Out approach is adopted, we selected the probes to be incorporated into the gallery by normalizing the scores without implementing RBSN or GRBSN. The results of this experiment are summarized in Table II.4. We observed that $t_2$ yields better performance compared to $t_1$ for the previous version of ORBSN in 11/18 cases, while for the present version this is true in 12/18 cases. Although, in 12/18 cases we may obtain better performance in at least one of the two thresholds if the old version of ORBSN is used instead of the present one. By taking into consideration the increased performance obtained under the optimal scenario, we may conclude that this can be attributed to fact that the new version aggregates the errors. That is, in the new version incorrectly labeled samples are incorporated to G and they are used when: (i) a new probe is matched against the gallery, and (ii) the gallery versus gallery scores are re-computed. For the old version however, these probes are only used as part of the gallery-based information. In addition, we note that our framework is expected to not yield significant improvements for the database. This is better illustrated by FIG. 12 where the subsets C, appear to be homogeneous. Hence, partitioning the scores does not benefit the score normalization. Even worse, it used smaller sets to compute the necessary estimates. In relation with FIG. 8, it is evident why the obtained results on UHDB11 are better. Indicatively, we note that in Experiment II.2 the osi-ΔAUC under the optimal scenario is 693.03 for UHDB11 while for FRGC v2 it is only 340.71. Nonetheless, augmenting G by using correct identity estimations (e.g., a user updates the gallery) the performance of the system may be significantly improved.

Time Complexity

We used a random probe from FRGC v2 under the protocol defined in Experiment II.1 and computed the time in seconds for Z-score, RBSN:Z-score and GRBSN:Z-$score_b$. The obtained values are 0.01 s, 0.13 s and 145.25 s, respectively. By exploiting two, four and eight scores for GRBSN:Z-$score_b$ we obtain 71.21 s, 40.70 s and 31.90 s, respectively, In a similar manner, we computed the time in seconds for Z-score by using a random probe from FRGC v2 under the protocol defined in Experiment II.4. The time needed to normalize the scores is 0.01 s. We provide the corresponding results for ORBSN:Z-$score_o$ when exploiting two, four and eight scores. The obtained values are 142.44 s, 80.56 s and 62.21 s, respectively.

A summary of the results from Experiment II.4 are set forth in Table II.4. The OSI-E and max-DIR refer to absolute values, where for the latter the maximum DIR performance is reported. The osi-ΔAUC and vr-ΔAUC refer to the relative improvement of the raw scores performance, while the Sum and Max rules refer to the integration method employed. The relative experimental protocol is described in Section II.4.

TABLE 11.4

Summary of Results of Example II.4

| | FRGC v2 | | | | | | | |
|---|---|---|---|---|---|---|---|---|
| | Sum Rule | | | | Max Rule | | | |
| | Open-set Identification | | | | Open-set Identification | | | |
| Method | OSI-E (%) | max-DIR (%) | osi-ΔAUC | Verification vr-ΔAUC | OSI-E (%) | max-DIR (%) | osi-ΔAUC | Verification vr-ΔAUC |
| Z-score$_p$ | 2.5 | 97.5 | 93.59 | 89.41 | 2.5 | 97.5 | 93.62 | 89.41 |
| ORBSN:Z-score$_p$ | 1.43 | 98.57 | 106.70 | 103.52 | 1.10 | 98.90 | 91.00 | 101.44 |
| ORBSN:Z-score$_{bt2}$ | 2.72 | 97.28 | 89.30 | 95.28 | 2.72 | 97.28 | 89.30 | 95.28 |
| ORBSN:Z-score$_{bt1}$ | 2.50 | 97.50 | 93.73 | 89.52 | 2.50 | 97.50 | 93.70 | 89.52 |
| ORBSN:Z-score$_{t2}$ | 2.31 | 97.69 | 59.57 | 87.81 | 2.94 | 97.03 | 29.92 | 75.90 |
| ORBSN:Z-score$_{t1}$ | 2.64 | 97.36 | 83.62 | 87.66 | 3.08 | 96.92 | 93.92 | 89.40 |
| ORBSN:Z-score$_o$ | 0.95 | 99.05 | 106.31 | 100.38 | 0.77 | 99.23 | 95.41 | 99.58 |
| W-score$_p$ | 2.50 | NaN | NaN | 65.85 | 2.50 | NaN | NaN | 65.85 |
| ORBSN:W-score$_p$ | 8.81 | NaN | NaN | 66.69 | 12.41 | NaN | NaN | 67.35 |
| ORBSN:W-score$_{bt2}$ | 2.24 | NaN | NaN | 71.49 | 2.24 | NaN | NaN | 71.49 |
| ORBSN:W-score$_{bt1}$ | 2.46 | NaN | NaN | 72.77 | 2.46 | NaN | NaN | 72.77 |
| ORBSN:W-score$_{t2}$ | 11.75 | NaN | NaN | 80.83 | 28.06 | NaN | NaN | 54.94 |
| ORBSN:W-score$_{t1}$ | 2.61 | NaN | NaN | 77.99 | 2.60 | NaN | NaN | 77.99 |
| ORBSN:W-score$_o$ | 0.99 | NaN | NaN | 109.00 | 0.51 | NaN | NaN | 113.66 |
| MAD$_p$ | 2.50 | 97.47 | 70.43 | 78.33 | 2.50 | NaN | NaN | 78.33 |
| ORBSN:MAD$_p$ | 1.65 | 98.35 | 111.97 | 104.92 | 1.40 | NaN | NaN | 100.85 |
| ORBSN:MAD$_{bt2}$ | 4.22 | 95.70 | 47.83 | 78.52 | 4.22 | NaN | NaN | 78.52 |
| ORBSN:MAD$_{bt1}$ | 2.64 | 97.32 | 54.31 | 72.73 | 2.64 | NaN | NaN | 72.73 |
| ORBSN:MAD$_{t2}$ | 4.59 | 95.30 | 54.94 | 81.61 | 10.65 | NaN | NaN | 64.67 |
| ORBSN:MAD$_{t1}$ | 7.30 | 92.43 | 18.47 | 65.30 | 19.87 | NaN | NaN | 58.73 |
| ORBSN:MAD$_o$ | 2.42 | 97.58 | 82.99 | 89.13 | 1.62 | NaN | NaN | 87.11 |

II.5. Conclusion

We have presented a rank-based score normalization framework that consists of three different algorithms. Unlike other approaches (e.g., [22], [23]), our first algorithm uses the rank of the scores for each gallery subject to partition the set of scores for a probe and normalizes each subset individually. The second algorithm exploits gallery-based information, while the third algorithm dynamically augments the gallery in an online fashion and can be employed to single-sample galleries. The experimental evaluation indicates that the use of our framework for unimodal systems may yield increased performance. Exploiting the gallery-based information by estimating the probe's identity appears to be robust. Furthermore, the online version of our framework appears to result in significantly better performance for single-sample galleries when the identity estimation is successful. Finally, according to the relevant statistical tests, the performance of our framework appears to improve as we increase the number of samples per subject. Also, it appears to yield increased match and non-match scores separation for each probe.

PART II REFERENCES OF THE INVENTION

The following references were cited in the application contain general background information used to support and explain certain aspects of the invention:

[1] J. Fortuna, P. Sivakumaran, A. Ariyaeeinia, and A. Malegaonkar, "Relative effectiveness of score normalisation methods in open-set speaker identification," in *Proc. The Speaker and Language Recognition Workshop*, Toledo, Spain, May 31-Jun. 3, 2004.

[2] A. Jain, K. Nandakumar, and A. Ross, "Score normalization in multimodal biometric systems," *Pattern Recognition*, vol. 38, no. 12, pp. 2270-2285, 2005.

[3] J. F. G. Shakhnarovich and T. Darrell, "Face recognition from longterm observations," in *Proc. of European Conf on Computer Vision*, Copenhagen, Denmark, May 27-Jun. 2, 2002, pp. 851-865.

[4] P. Moutafis and I. A. Kakadiaris, "Can we do better in unimodal biometric systems? a novel rank-based score normalization framework for multi-sample galleries," in *Proc. International Conference on Biometrics*, Madrid, Spain, Jun. 4-7, 2013.

[5] P. Phillips, P. Flynn, T. Scruggs, K. Bowyer, J. Chang, K. Hoffman, J. Marques, J. Min, and W. Worek, "Overview of the face recognition grand challenge," in *Proc. IEEE Computer Society Conference on Computer Vision and Pattern Recognition*, vol. 1, San Diego, Calif., Jun. 20-25, 2005, pp. 947-954.

[6] J. Phillips, T. Scruggs, A. O'Toole, P. Flynn, K. Bowyer, C. Schott, and M. Sharpe, "FRVT 2006 and ICE 2006 large-scale results," National Institute of Standards and Technology, Gaithersburg, Md. 20899, Tech. Rep. NISTIR 7408, March 2007.

[7] G. Toderici, G. Evangelopoulos, T. Fang, T. Theoharis, and I. Kakadiaris, "UHDB11 database for 3d-2d face recognition," in Pacific-Rim Symposium on Image and Video Technology, Oct. 28, 2013, pp. 1-14.

[8] W. Scheirer, A. Rocha, R. Micheals, and T. Boult, "Robust fusion: extreme value theory for recognition score normalization," in *Proc. European Conference on Computer Vision*, vol. 6313, Crete, Greece, Sep. 5-11, 2010, pp. 481-495.

[9] J. Kittler, M. Hatef, R. Duin, and J. Matas, "On combining classifiers," *IEEE Transactions on Pattern Analysis and Machine Intelligence*, vol. 20, no. 3, pp. 226-239, 1998.

[10] E. Wolfstetter et al., *Stochastic dominance: theory and applications*. Humboldt-Univ., Wirtschaftswiss. Fak., 1993.

[11] S. Durlauf, L. Blume et al., The new palgrave dictionary of economics. Palgrave Macmillan, 2008.

[12] M. Birnbaum, J. Patton, and M. Lott, "Evidence against rank-dependent utility theories: tests of cumulative independence, interval independence, stochastic dominance, and transitivity," *Organizational Behavior and Human Decision Processes*, vol. 77, no. 1, pp. 44-83, 1999.

[13] J. Hadar and W. R. Russell, "Rules for ordering uncertain prospects," *The American Economic Review*, vol. 59, no. 1, pp. pp. 25-34, 1969. [Online]. Available: http://www.jstor.org/stable/1811090

[14] G. Toderici, G. Passalis, S. Zafeiriou, G. Tzimiropoulos, M. Petrou, T. Theoharis, and I. Kakadiaris, "Bidirectional relighting for 3D-aided 2D face recognition," in *Proc. IEEE Computer Society Conference on Computer Vision and Pattern Recognition*, San Francisco, Calif., Jun. 13-18, 2010, pp. 2721-2728.

[15] O. Ocegueda, G. Passalis, T. Theoharis, S. Shah, and I. Kakadiaris, "UR3D-C: Linear dimensionality reduction for efficient 3D face recognition," in *Proc. International Joint Conference on Biometrics*, Washington D.C., Oct. 11-13, 2011, pp. 1-6.

[16] A. Savran, N. Alytiz, H. Dibeklioğlu, O. Çeliktutan, B. Gökberk, B. Sankur, and L. Akarun, "Bosphorus database for 3D face analysis," in *Proc. 1st COST 2101 Workshop on Biometrics and Identity Management*, Roskilde, Denmark, May 2008, pp. 47-56.

[17] National Science and Technology Council Subcommittee on Biometrics. (2006 Sep. 14) Biometrics glossary. [Online]. Available: http://biometrics.gov/Documents/Glossary.pdf

[18] D. Garcia-Romero, J. Gonzalez-Rodriguez, J. Fierrez-Aguilar, and J. Ortega-Garcia, "U-norm likelihood normalization in pin-based speaker verification systems," in *Proc. Audio-and Video-Based Biometric Person Authentication*, Guildford, UK, Jun. 9-11, 2003, pp. 208-213.

[19] K. Toh, X. Jiang, and W. Yau, "Exploiting global and local decisions for multimodal biometrics verification," *Signal Processing*, vol. 52, no. 10, pp. 3059-3072, October 2004.

[20] J. Fierrez-Aguilar, D. Garcia-Romero, J. Ortega-Garcia, and J. Gonzalez-Rodriguez, "Exploiting general knowledge in user-dependent fusion strategies for multimodal biometric verification," in *Proc. Int. Conference on Acoustics, Speech, and Signal Processing*, vol. 5, May 17-21, pp. 617-620.

[21] M. Hollander, D. Wolfe, and E. Chicken, Nonparametric statistical methods. John Wiley and Sons, 2013.

[22] R. Brunelli and D. Falavigna, "Person identification using multiple cues," *IEEE Transactions on Pattern Analysis and Machine Intelligence*, vol. 17, no. 10, pp. 955-966, 1995.

[23] K. Nandakumar, A. Jain, and A. Ross, "Fusion in multibiometric identification systems: what about the missing data?" *Advances in Biometrics*, pp. 743-752, 2009.

Illustrative Method Schematics

Figure 13:
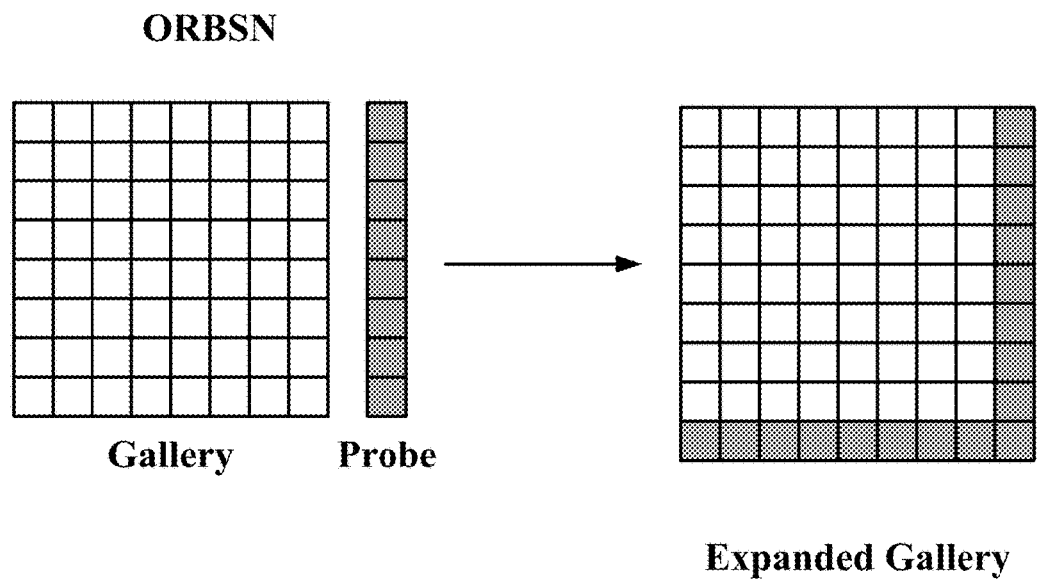
FIG. 13 depicts a schematic operation of a procedure of ORBSN in applying a probe to a gallery and if the probe data meets certain criteria, then the probe and gallery may be concatenated to form an expanded gallery.

Referring now to FIG. 13, a schematic operation of a procedure of ORBSN for expanding an expanded gallery based on a probe is shown. The procedure includes a gallery and a probe. If the probe meets certain criteria, then the gallery may be enhanced the probe to form the expanded gallery.

Figure 14:
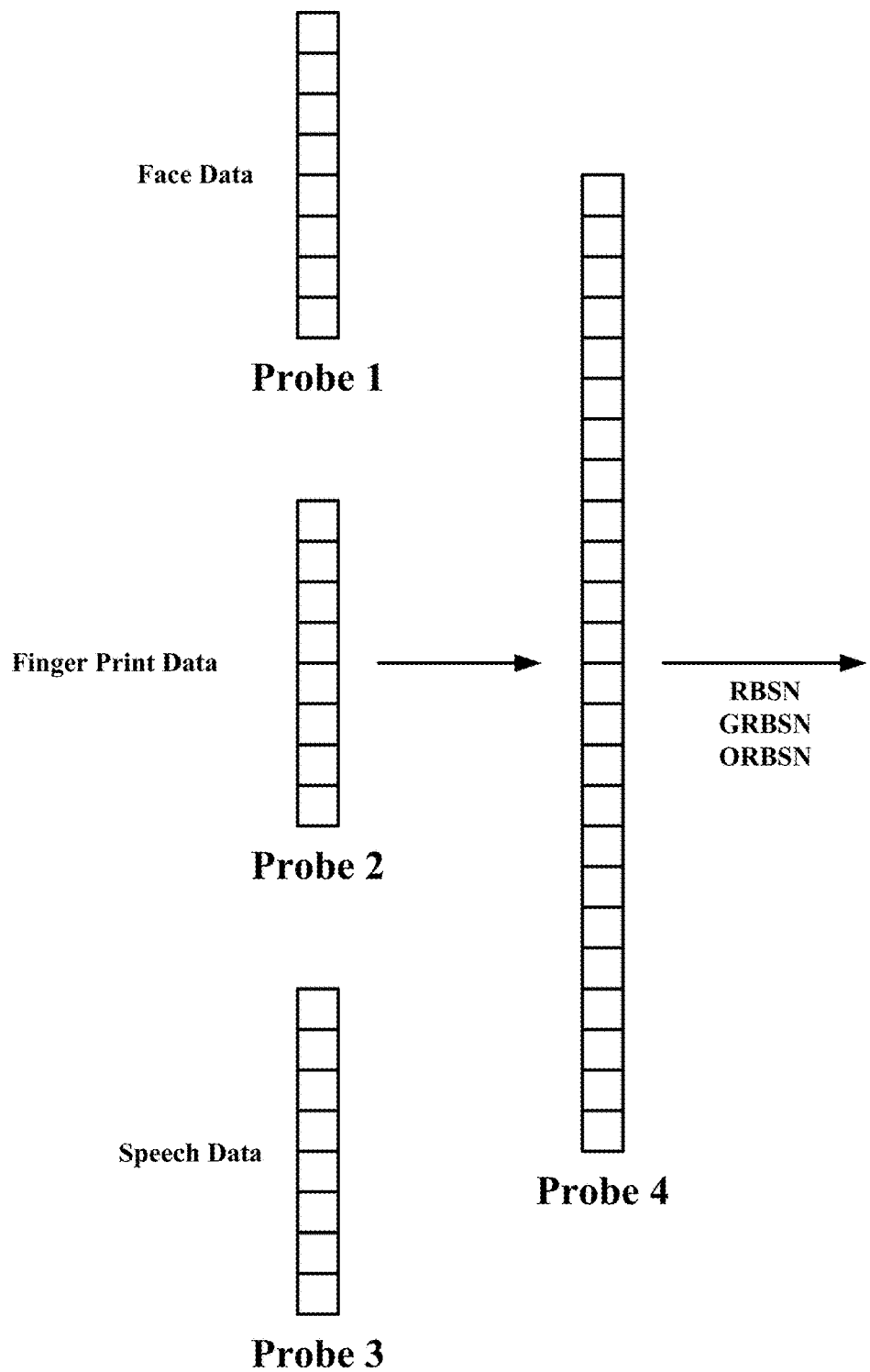
FIG. 14 depicts a schematic operation of combining different probes to form a concatenated probe, which may then be used in the RBSN, GRBSN and/or ORBSN procedures of this invention.

Referring now to FIG. 14, a schematic operation of combining different probes to form a concatenated probe is shown. The operation is illustrated using three different probes of the same subject, a first probe probe 1 comprising face data, a second probe probe 2 comprising finger print data, and a third probe probe 3 comprising speech data. The three probes, probe 1, probe 2, and probe 3, are then combined into a single probe, probe 4. The single probe probe 4, is then used as the probe in either RBSN, GRBSN and/or ORBSN procedures of this invention.

First Specific Embodiment

Figure 15:
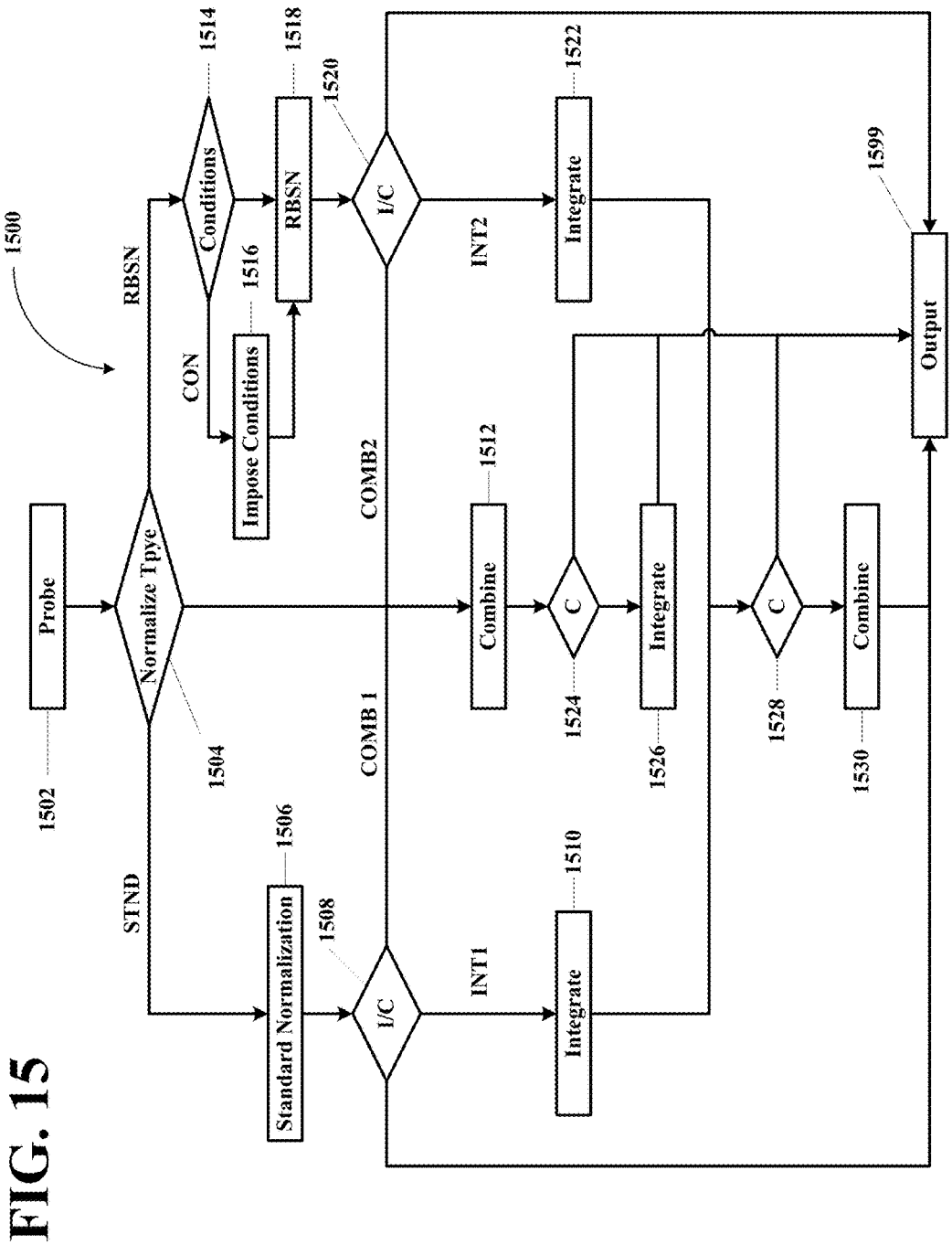
FIG. 15 depicts an embodiment of a method of this invention utilizing probe specific data.

Referring now to FIG. 15, an embodiment of a probe specific method, generally 1500, is shown to include obtaining a probe 1502. The method 1500 also includes a normalization type step 1504, where the probe 1502 is subjected either to a standard normalization along a standard normalization path STND or to a RBSN normalization along a RBSN normalization path RBSN.

If the STND path is selected, the probe 1502 is normalized in a standard normalization step 1506. Next, the standard normalized probe is subjected to an I/C conditional step 1508. If integration is selected, then the method 1500 proceeds along an integration path INT1 to an integration step 1510, where the standard normalized probe is integrated. If combination is selected, then the method 1500 proceeds along a combination path COMB1, where the standard normalized probe is combined with a RBSN normalized probe in a combine step 1512. If neither integration or combination is selected, then the method 1500 proceeds to an output step 1599, where results are outputted to a user. If no integration is selected, then the method 1500 forwards the probe directly to the combine step 1512.

If the RBSN path is selected, the method 1500 includes a conditions step 1514. If conditions are imposed, then the method 1500 proceeds along a CON path, where the conditions are applied in an impose conditions step 1516 and then forwarded to an RBSN normalization step 1518. If no conditions are imposed, then the method 1500 proceeds directly to the RBSN normalization step 1518. After RBSN normalization, the RBSN normalized probe is subjected to an I/C conditional step 1520. If integration is selected, then the method 1500 proceeds along an integration path INT2 to an integration step 1522, where the RBSN normalized probe is integrated. If combination is selected, then the method 1500 proceeds along a combination path COMB2, where the RBSN normalized probe is combined with the standard normalized probe in the combine step 1512. If neither integration or combination is selected, then the method 1500 proceeds to an output step 1599.

Once the standard normalized probe and the RBSN normalized probe are combined in the combine step 1512, the combined probe is subjected to an integrate conditional step 1524. If integration is selected, then the combined probed is integrated in an integration step 1526, and the results are forwarded to the output step 1599. If integration is not selected, then the method 1500 proceeds directly to the output step 1599.

Once the standard normalized probe is integrated in the integration step 1510 and the RBSN normalized probe is integrated in the integration step 1522, the integrated probes are forwarded combination conditional step 1528. If combination is selected, the integrated probes are combined in a combine step 1530, and the results are forwarded to the output step 1599. If combination is not selected, the results are sent directly to the output step 1599.

Second Specific Embodiment

Figure 16:
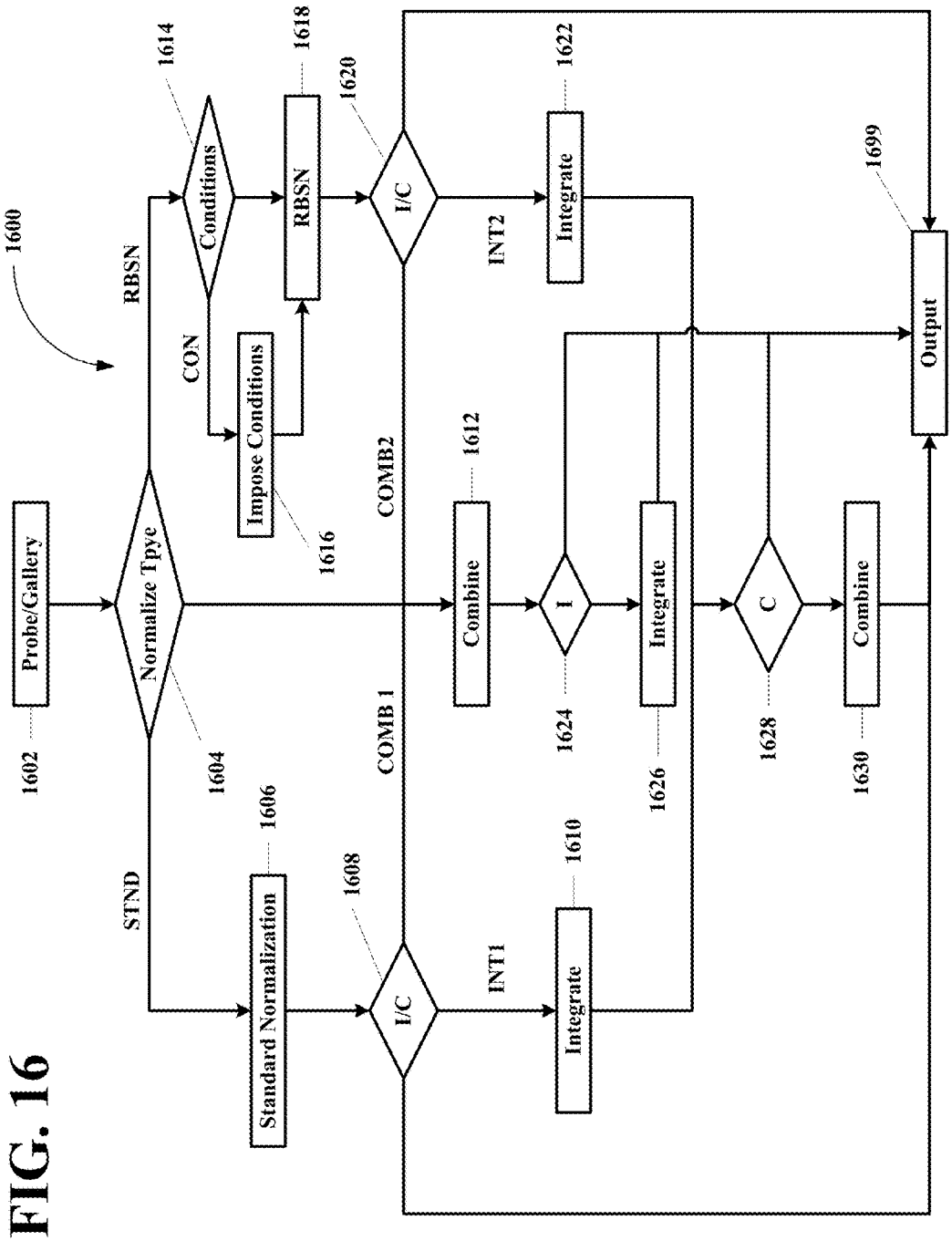
FIG. 16 depicts an embodiment of a method of this invention utilizing gallery specific data.

Referring now to FIG. 16, an embodiment of a gallery specific method, generally 1600, is shown to include a probe and a gallery 1602. The method 1600 also includes a normalization type step 1604, where the probe 1602 is subjected either to a standard normalization along a standard normalization path STND or to a RBSN normalization along a RBSN normalization path RBSN. In certain embodiments, the normalization type step 1604 may direct the normalization on a row-by-row basis so that each row may be separately normalized by the standard normalization procedure and/or by the RBSN normalization procedure.

If the STND path is selected, the probe 1602 is normalized in a standard normalization step 1606. Next, the standard normalized probe is subjected to an I/C conditional step 1608. If integration is selected, then the method 1600 proceeds along an integration path INT1 to an integration step 1610, where the standard normalized probe is integrated. If combination is selected, then the method 1600 proceeds along a combination path COMB1, where the standard normalized probe is combined with a RBSN normalized probe in a combine step 1612. If neither integration or combination is selected, then the method 1600 proceeds to an output step 1699, where results are outputted to a user. If no integration is selected, then the method 1600 forwards the probe directly to the combine step 1612.

If the RBSN path is selected, the method 1600 includes a conditions step 1614. If conditions are imposed, then the method 1600 proceeds along a CON path, where the conditions are applied in an impose conditions step 1616 and then forwarded to an RBSN normalization step 1618. If no conditions are imposed, then the method 1600 proceeds directly to the RBSN normalization step 1618. After RBSN normalization, the RBSN normalized probe is subjected to an I/C conditional step 1620. If integration is selected, then the method 1600 proceeds along an integration path INT2 to an integration step 1622, where the RBSN normalized probe is integrated. If combination is selected, then the method 1600 proceeds along a combination path COMB2, where the RBSN normalized probe is combined with the standard normalized probe in the combine step 1612. If neither integration or combination is selected, then the method 1600 proceeds to an output step 1699.

Once the standard normalized probe and the RBSN normalized probe are combined in the combine step 1612, the combined probe is subjected to an integrate conditional step 1624. If integration is selected, then the combined probed is integrated in an integration step 1626, and the results are forwarded to the output step 1599. If integration is not selected, then the method 1600 proceeds directly to the output step 1699.

Once the standard normalized probe is integrated in the integration step 1610 and the RBSN normalized probe is integrated in the integration step 1622, the integrated probes are forwarded combination conditional step 1628. If combination is selected, the integrated probes are combined in a combine step 1630, and the results are forwarded to the output step 1699. If combination is not selected, the results are sent directly to the output step 1699.

Probe and Gallery Specific Methods

Figure 17B:
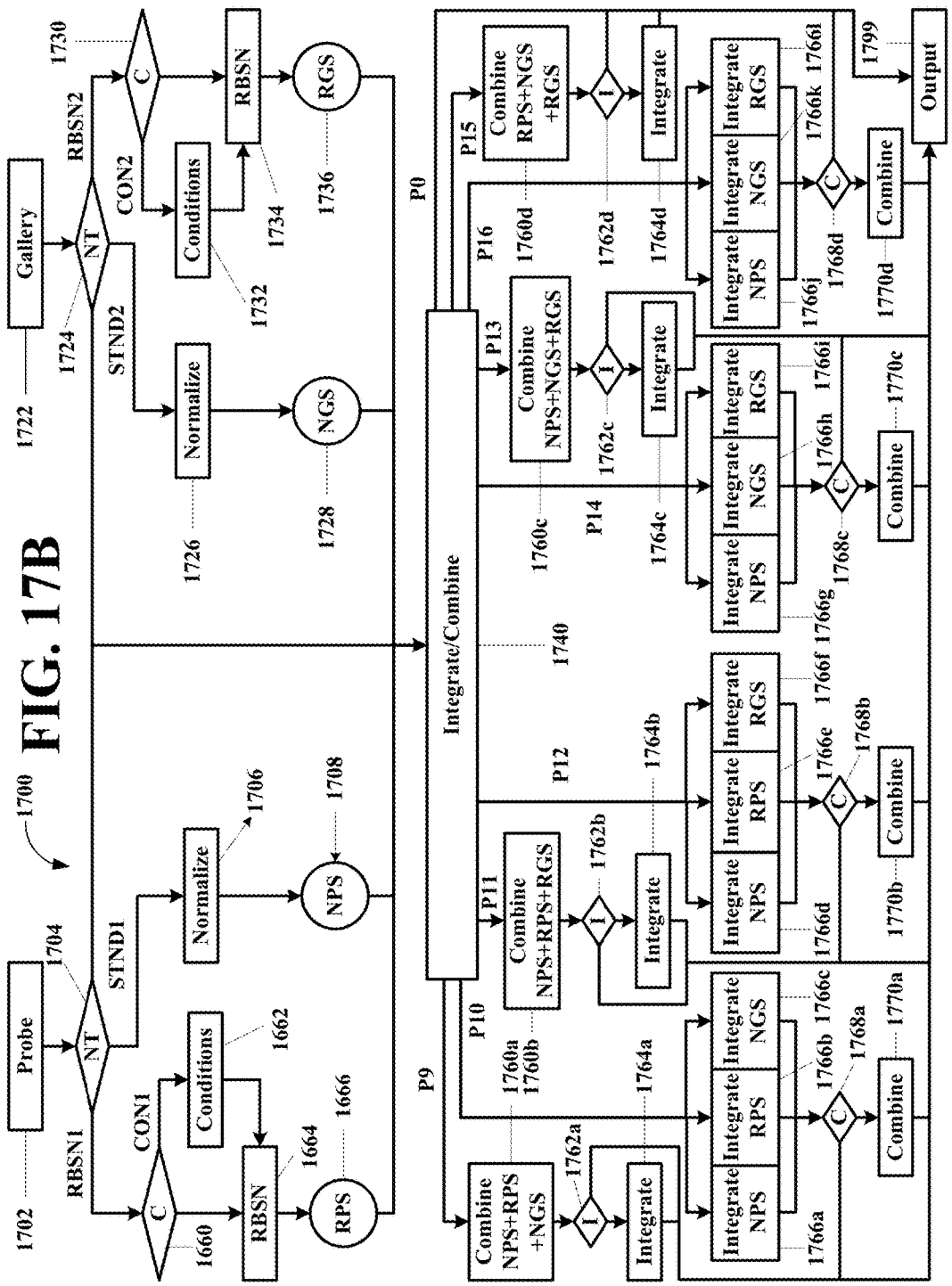
Figure 17C:
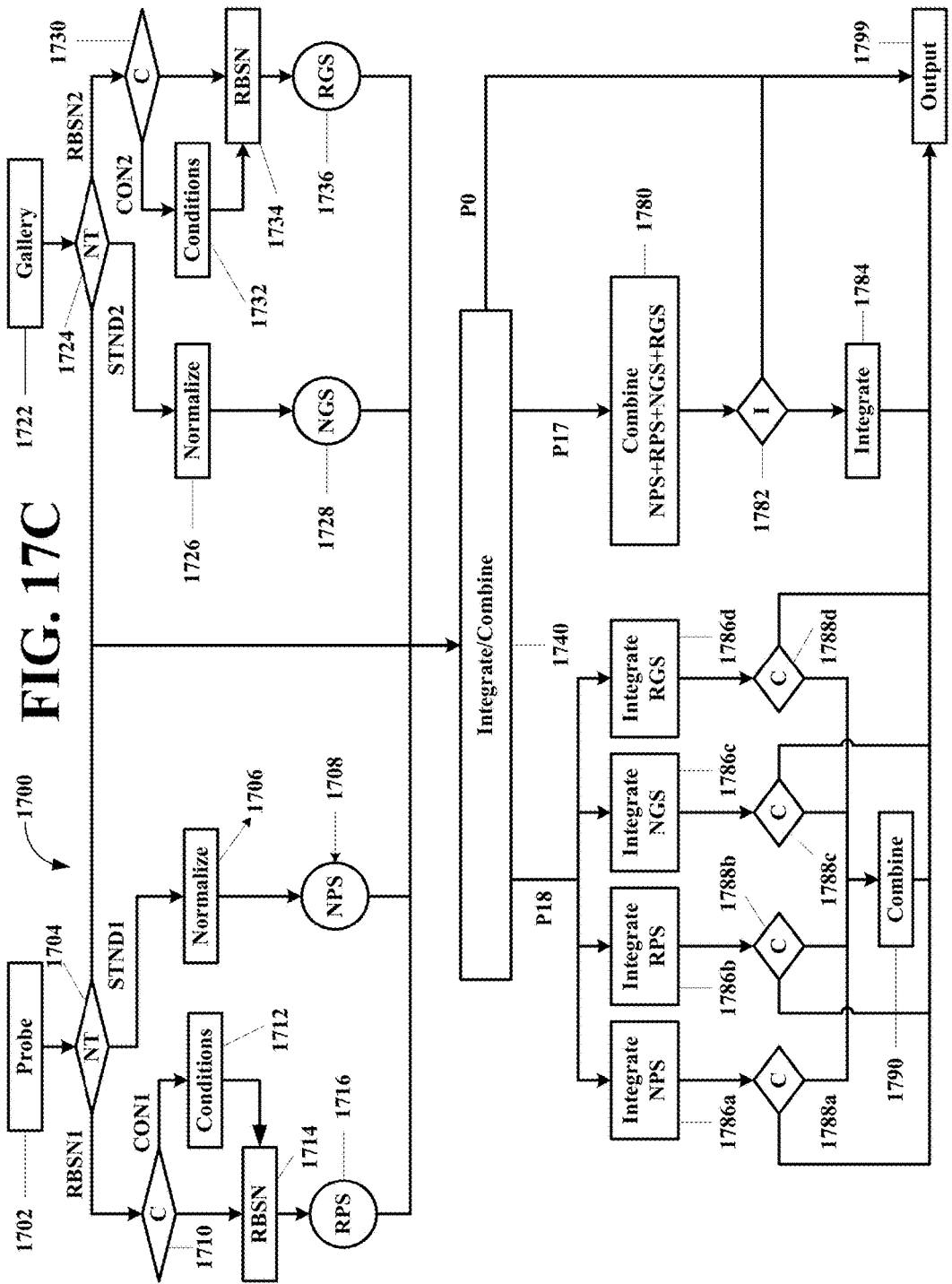

Referring now to FIG. 17A-C, an embodiment of a method, generally 1700, is shown utilizing a probe 1702 and a gallery 1722.

The method 1700 also includes a probe normalization type step 1704, where the method 1700 proceeds along either to a standard normalization path STND1, a RBSN normalization path RBSN1, or directly to a integrate/combine step 1740.

If the STND1 path is selected, the probe 1702 is normalized in a standard normalization step 1706 to form a standard normalized probe (NPS) 1708. If the RBSN path is selected, the method 1700 includes a conditions step 1710. If conditions are imposed, then the method 1700 proceeds along a CON1 path, where the conditions are applied in an impose conditions step 1712 and then forwarded to an RBSN normalization step 1714 to form a RBSN normalized probe (RPS) 1716; other wise the method 1700 proceed directly to the RBSN normalization step 1714. If neither normalization procedure is selected, then the method proceed directly to the integrate/combine step 1740.

The method 1700 also includes a gallery normalization type step 1724, where the method 1700 proceeds along either to a standard normalization path STND2 or a RBSN normalization path RBSN2. In certain embodiments, the normalization type step 1724 may direct the normalization on a row-by-row basis so that each row may be separately normalized by the standard normalization procedure or by the RBSN normalization procedure.

If the STND2 path is selected, the gallery 1722 is normalized in a standard normalization step 1726 to form a standard normalized probe (NGS) 1728. If the RBSN path is selected, the method 1700 includes a conditions step 1730. If conditions are imposed, then the method 1700 proceeds along a CON2 path, where the conditions are applied in an impose conditions step 1732 and then forwarded to an RBSN normalization step 1734 to form a RBSN normalized probe (RGS) 1736.

Once NPS, RPS, NGS, and RGS have been generated, they are passed onto an integrate/combine conditions step 1740. If neither normalization procedure is selected, then the method proceed directly to the integrate/combine step 1740.

First Part of Gallery Specific Methods

Looking at FIG. 17A, the integrate/combine conditions step 1740 generates nine paths P0, P1, P2, P3, P4, P5, P6, P7, and P8, where path P0 directs the results directly to an output step 1799.

NPS/RPS

If the method 1700 proceeds along the path P1, NPS and RPS are combined in a combination step 1742*a*. After combination, the results are forwarded to an integration conditional step 1744*a*. If integration is selected, then the results are integrated in an integration step 1746*a* and then the results are forwarded to the output step 1799; if not, the results are forwarded directly to the output step 1799.

If the method 1700 proceeds along the path P2, NPS and RPS are integrated in integration steps 1748*a&b*. After integration, the method 1700 proceeds to a combination conditional step 1750*a*. If the combination is select, then the method 1700 proceeds to a combine step 1752*a*, and then to the output step 1799; otherwise, the results proceed directly to the output step 1799.

NPS/RGS

If the method 1700 proceeds along the path P3, NPS and RGS are combined in a combination step 1742*b*. After combination, the results are forwarded to an integration conditional step 1744*b*. If integration is selected, then the results are integrated in an integration step 1746*b*, and then the results are forwarded to the output step 1799; if not, the results are forwarded directly to the output step 1799.

If the method 1700 proceeds along the path P4, NPS and RGS are integrated in integration steps 1748*c&d*. After integration, the method 1700 proceeds to a combination conditional step 1750*b*. If the combination is select, then the method 1700 proceeds to a combine step 1752*b*, and then to the output step 1799; otherwise, the results proceed directly to the output step 1799.

RPS/NGS

If the method 1700 proceeds along the path P5, RPS and NGS are combined in a combination step 1742c. After combination, the results are forwarded to an integration conditional step 1744c. If integration is selected, then the results are integrated in an integration step 1746c, and then the results are forwarded to the output step 1799; if not, the results are forwarded directly to the output step 1799.

If the method 1700 proceeds along the path P6, NPS and RGS are integrated in integration steps 1748e&f. After integration, the method 1700 proceeds to a combination conditional step 1750c. If the combination is select, then the method 1700 proceeds to a combine step 1752c, and then to the output step 1799; otherwise, the results proceed directly to the output step 1799.

RGS/NGS

If the method 1700 proceeds along the path P7, RPS and RGS are combined in a combination step 1742d. After combination, the results are forwarded to an integration conditional step 1744d. If integration is selected, then the results are integrated in an integration step 1746d, and then the results are forwarded to the output step 1799; if not, the results are forwarded directly to the output step 1799.

If the method 1700 proceeds along the path P8, NPS and RGS are integrated in integration steps 1748g&h. After integration, the method 1700 proceeds to a combination conditional step 1750d. If the combination is select, then the method 1700 proceeds to a combine step 1752d, and then to the output step 1799; otherwise, the results proceed directly to the output step 1799.

Second Part of Gallery Specific Methods

Looking at FIG. 17B, the method integrate/combine conditions step 1740, generates eight paths P0, P8, P9, P10, P11, P12, P13, P14, and P15.

NPS/RPS/NGS

If the method 1700 proceeds along the path P9, NPS, RPS, and NGS are combined in a combination step 1760a. After combination, the method 1700 proceeds to an integrate conditional step 1762a. If integration is selected, then the results are integrated in an integration step 1764a, and then the results are forwarded to the output step 1799; otherwise, the results are forwarded directly to the output step 1799.

If the method 1700 proceeds along the path P10, NPS, RPS, and NGS are integrated in integration steps 1766a-c. After integration, the method 1700 proceeds to a combination conditional step 1768a. If combination is selected, the method 1700 proceeds to a combine step 1770a, and then to the output step 1799; otherwise the results proceed directly to the output step 1799.

NPS/RPS/RGS

If the method 1700 proceeds along the path P11, NPS, RPS, and RGS are combined in a combination step 1760b. After combination, the method 1700 proceeds to an integrate conditional step 1762b. If integration is selected, then the results are integrated in an integration step 1764b, and then the results are forwarded to the output step 1799; otherwise, the results are forwarded directly to the output step 1799.

If the method 1700 proceeds along the path P12, NPS, RPS, and RGS are integrated in integration steps 1766d-f. After integration, the method 1700 proceeds to a combination conditional step 1768b. If combination is selected, the method 1700 proceeds to a combine step 1770b, and then to the output step 1799; otherwise the results proceed directly to the output step 1799.

NPS/NGS/RGS

If the method 1700 proceeds along the path P13, NPS, NGS, and RGS are combined in a combination step 1760c. After combination, the method 1700 proceeds to an integrate conditional step 1762c. If integration is selected, then the results are integrated in an integration step 1764c, and then the results are forwarded to the output step 1799; otherwise, the results are forwarded directly to the output step 1799.

If the method 1700 proceeds along the path P14, NPS, NGS, and RGS are integrated in integration steps 1766g-i. After integration, the method 1700 proceeds to a combination conditional step 1768c. If combination is selected, the method 1700 proceeds to a combine step 1770c, and then to the output step 1799; otherwise the results proceed directly to the output step 1799.

RPS/NGS/RGS

If the method 1700 proceeds along the path P15, RPS, NGS, and RGS are combined in a combination step 1760d. After combination, the method 1700 proceeds to an integrate conditional step 1762d. If integration is selected, then the results are integrated in an integration step 1764d, and then the results are forwarded to the output step 1799; otherwise, the results are forwarded directly to the output step 1799.

If the method 1700 proceeds along the path P16, RPS, NGS, and RGS are integrated in integration steps 1766j-l. After integration, the method 1700 proceeds to a combination conditional step 1768d. If combination is selected, the method 1700 proceeds to a combine step 1770d, and then to the output step 1799; otherwise the results proceed directly to the output step 1799.

Third Part of Gallery Specific Methods

Looking at FIG. 17C, the method integrate/combine conditions step 1740, generates eight paths P0, P17 and P18.

NPS/RPS/NGS/RGS

If the method 1700 proceeds along the path P17, NPS, RPS, NGS, and RGS are combined in a combination step 1780. After combination, the method 1700 proceeds to an integration conditional step 1782. If integration is selected, the method 1700 proceeds to an integration step 1784, and then the results proceed to the output step 1799; otherwise the results proceed directly to the output step 1799.

If the method 1700 proceeds along the path P18, NPS, RPS, NGS, and RGS are integrated in integration steps 1786a-d. After integration, the method 1700 proceeds to combination conditional steps 1788a-d. If combination is selected, the method 1700 proceeds to a combination step 1790, and then the results proceed to the output step 1799; otherwise the results proceed directly to the output step 1799.

Generalized Methods Using Normalization and Integration

Figure 18:
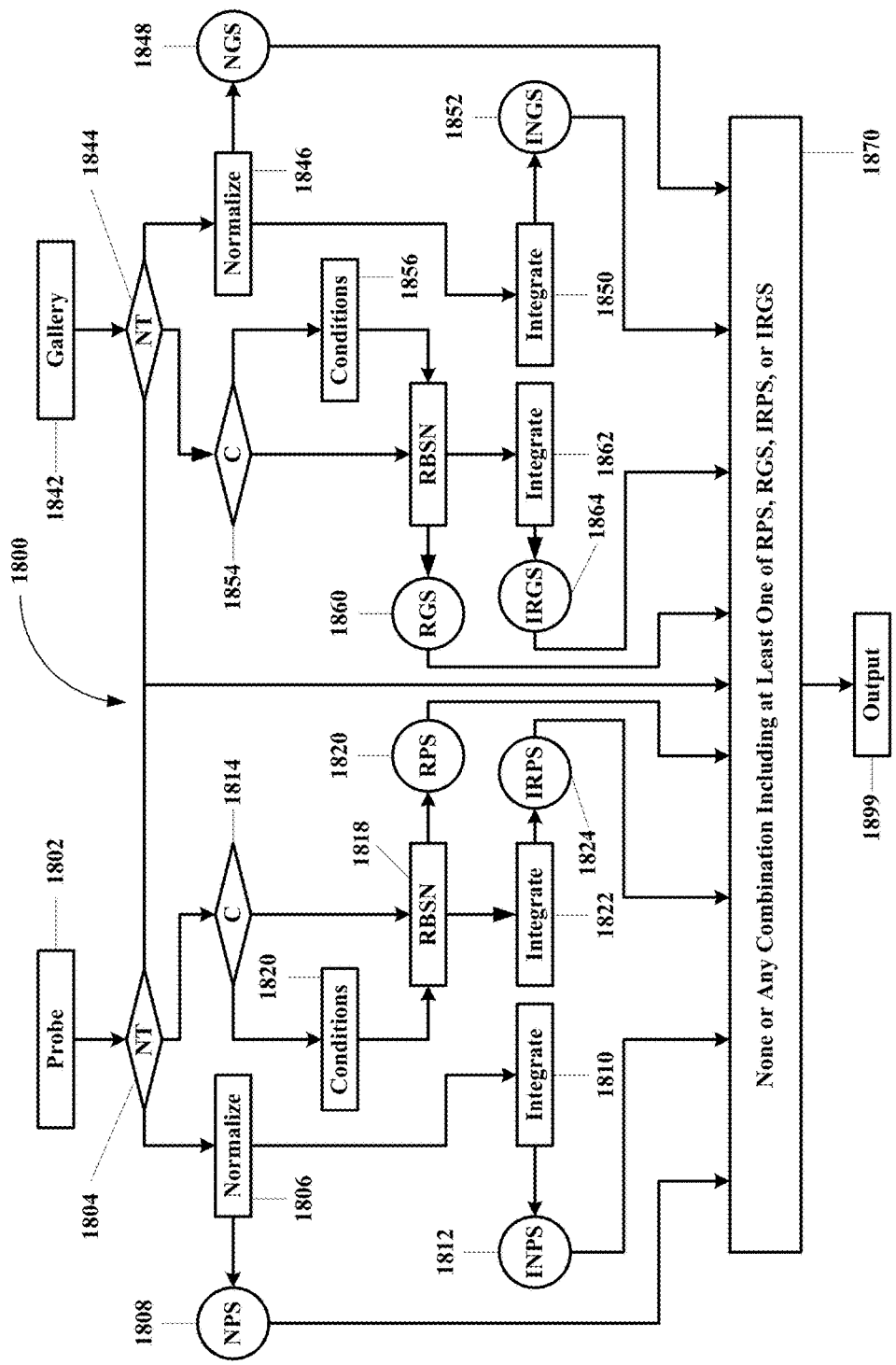
FIG. 18 depicts another embodiment of a method of this invention utilizing probe specific and gallery specific data.

Referring now to FIG. 18, another embodiment of a probe specific and gallery specific method, generally 1800, is shown to include a probe 1802 and a gallery 1842.

The method 1800 includes a probe normalization type step 1804, where the method 1800 proceeds along either a standard normalization path STND1 or a RBSN normalization path RBSN1.

If the STND1 path is selected, the probe 1802 is normalized in a standard normalization step 1806 to form a standard normalized probe (NPS) 1808. The method 1800 also includes an integrate step 1810 to form an integrated standard normalized probe (INPS) 1812.

If the RBSN1 path is selected, the method 1800 includes a conditions step 1814. If conditions are imposed, then the method 1800 proceeds along a CON1 path, where the conditions are applied in an impose conditions step 1816 and then forwarded to an RBSN normalization step 1818 to form a RBSN normalized probe (RPS) 1820. The method 1800 also includes an integrate step 1822 to form an integrated RBSN normalized probe (IRPS) 1824.

The method 1800 also includes a gallery normalization type step 1844, where the method 1800 proceeds along either to a standard normalization path STND2 or a RBSN normalization path RBSN2. In certain embodiments, the normalization type step 1844 may direct the normalization on a row-by-row basis so that each row may be separately normalized by the standard normalization procedure or by the RBSN normalization procedure.

If the STND2 path is selected, the gallery 1842 is normalized in a standard normalization step 1846 to form a standard normalized gallery (NGS) 1848. The method 1800 also includes an integrate step 1850 to form an integrated standard normalized probe (INGS) 1852.

If the RBSN path is selected, the method 1800 includes a conditions step 1854. If conditions are imposed, then the method 1800 proceeds along a CON2 path, where the conditions are applied in an impose conditions step 1856 and then forwarded to an RBSN normalization step 1858 to form a RBSN normalized gallery (RGS) 1860. The method 1800 also includes an integrate step 1862 to form an integrated RBSN normalized gallery (IRGS) 1864.

Once NPS, INPS, RPS, IRPS, NGS, INGS, RGS, and IRGS have been generated, they are passed onto a combine and/or integration conditions step 1870, where any combination and/or integration (types of fusing) including at least one of the group consisting of RPS, RGS, IRPS, and IRGS.

All references cited herein are incorporated by reference. Although the invention has been disclosed with reference to specific embodiments, from reading this description, skilled artisan will appreciate changes and modifications may be made that do not depart from the scope and spirit of the invention as described above and claimed hereafter.

We claim:

1. A method for processing measures comprising the steps of:
   capturing a test sample comprising at least one facial image of an individual from a camera,
   comparing the test sample to each of a plurality of indexed samples to produce first measures, wherein the indexed samples comprise at least one facial image of a plurality of individuals captured using the same or different type of camera,
   computing first ranks for the first measures within each index representing a ranking of the indexed samples with respect to the first measures,
   forming first subsets from current measures, wherein each of the first subsets include current measures having a same first rank, wherein the current measures for this step comprise the first measures,
   transforming the current measures within each of the first subsets satisfying one condition or a plurality of conditions using one transformation or a plurality of transformations to form processed current measures, wherein the transformations are selected from the group consisting of a normalization transformation, an impose conditions transformation, an integration transformation, and a combination transformation,
   calculating scores based on the current measures and/or the processed current measures for each of the indexed samples relative to the test sample,
   ranking the indexed samples based on the scores, and
   outputting the current measures, the processed current measures, and ranked scores,
   wherein the method improves the scores relative to methods that do not partition the current measures into subsets prior to transforming the current measures.

2. The method claim 1, further comprising the step of:
   prior to the forming step, pre-processing the first measures to form first pre-processed measures, wherein the pre-processing comprises transforming the first measures using one transformation or a plurality of transformations, wherein the transformations are selected from the group consisting of a normalization transformation, an impose conditions transformation, an integration transformation, and a combination transformation,
   fusing none, some, or all of the first measures and/or the first pre-processed measures within each of the first subsets to form first fused measures,
   wherein the current measures comprise the first measures, the first pre-processed measures, the first fused measures, or any combination thereof.

3. The method claim 2, further comprising the step of:
   fusing none, some or all of the first measures, the first pre-processed measures, the first fused measures, the processed current measures, and the current measures to form second fused measures, wherein the current measures comprise the first measures, the first pre-processed measures, the first fused measures, the processed current measures, and/or the second fused measures.

4. The method of claim 1, further comprising the steps of:
   prior to the forming step, comparing the indexed samples to each other to produce second measures identified by each pair of indexed samples compared,
   assigning a second index to the first measures,
   creating a set for each indexed sample, wherein each set includes the first measures and the second measures for that indexed sample,
   computing second ranks for each measure within each of the sets based on the second index of the first measures and the second index of the second measures, wherein the second index of the second measures corresponds to the index of the samples used to produce the second measures of that set,
   forming second subsets for each set, wherein each of the second subsets includes second current measures having a same second rank, wherein the current measures comprise the first measures and the second measures,
   transforming the current measures within each of the second subsets using one transformation or a plurality of transformations satisfying one condition or a plurality of conditions to form second processed measures, wherein the transformations are selected from the group consisting of a normalization transformation, an impose conditions transformation, an integration transformation, and a combination transformation, and
   performing the remaining steps of claim 1,
   wherein the current measures comprise the first measures, the second measures, the second processed measures, or any combination thereof.

5. The method of claim 4, further comprising the steps of:
   prior to the forming step of claim 4, pre-processing the first measures to form first pre-processed measures, wherein the pre-processing comprises one transformation or a plurality of transformations of the first measures, wherein the transformations are selected from the group consisting of a normalization transformation, an impose conditions transformation, an integration transformation, and a combination transformation, pre-processing the second measures to form second pre-processed measures, wherein the pre-processing comprises one transformation or a plurality of transformations of the second measures, wherein the transformations are selected from the group consisting of a normalization transformation, an impose conditions transformation, an integration transformation, and a combination transformation, fusing (a) none, some, or all of the first measures and the first pre-processed measures to form first fused measures, (b) none, some, or all of the second measures and the second pre-processed measures to form second fused measures, or (c) none, some, or all of the first measures, the first pre-processed measures, the second measures and the second pre-processed measures to form mixed fused measures, and preforming the remaining steps of claim 4, using none, some, all, or sets of the current measures independently, wherein the second current measures comprise the first measures, the first pre-processed measures, the first fused measures, the second measures, the second pre-processed measures, the second fused measures, or any combination thereof.

6. A method for processing measures comprising the steps of:

capturing a multi-modal test sample comprising biometric data, speech data, medical data, medical imagining data, and other person specific data amenable to multi-class classification, wherein the biometric data includes at least facial image data and finger print data, and comparing the multi-modal test sample to indexed samples of equivalent multi-modal data to produce first measures, forming first subsets from current measures, wherein each of the first subsets comprise current measures having a same first rank, wherein the current measures for this step comprise the first measures, transforming the current measures within each of the first subsets satisfying one condition or a plurality of conditions using one transformation or a plurality of transformations to form processed current measures, wherein the transformations are selected from the group consisting of a normalization transformation, an impose conditions transformation, an integration transformation, and a combination transformation, calculating scores based on the current measures and/or the processed current measures of each of the indexed samples relative to the test sample, and determining an indexed sample having a score sufficient to identify the test sample with that indexed sample.

7. The method claim 6, further comprising the steps of:
outputting the current measures, the processed current measures, and the identified indexed sample.

8. The method claim 7, further comprising the steps of:
prior to the forming step, pre-processing the first measures to form first pre-processed measures, wherein the pre-processing comprises one transformation or a plurality of transformations of the first measures, wherein the transformations are selected from the group consisting of a normalization transformation, an impose conditions transformation, an integration transformation, and a combination transformation, fusing none, some, or all of the first measures, the first pre-processed measures, and/or the measures within each set to form first fused measures, performing the remaining steps of claim 7 using none, some, all, or sets of the current measures independently, wherein the current measures comprise the first measures, the first pre-processed measures, the first fused measures, or any combination thereof and fusing none, some or all of the first measures, the first pre-processed measures, the first fused measures, the processed current measures, and/or the measures within each set to form second fused measures.

9. The method of claim 7, further comprising the steps of:
prior to the forming step, comparing the indexed samples to each other to produce second measures identified by each pair of indexed samples compared, assigning a second index to the first measures, creating a set for each indexed sample, wherein each set includes the first measures and the second measures for that indexed sample, computing second ranks for each measure within each of the sets based on the second index of the first measures and the second index of the second measures, wherein the second index of the second measures corresponds to the index of the samples used to produce the second measures of that set, forming second subsets for each set, wherein each subset includes second current measures of the same second rank, wherein the second current measures comprise the first measures and the second measures, and processing the measures within each second subset that satisfy one condition or a plurality of conditions to form second processed measures, wherein the processing comprises a one or a plurality of transformation of the measures, wherein the transformations are selected from the group consisting of a normalization transformation, an impose conditions transformation, an integration transformation, and a combination transformation, and performing the remaining steps of claim 7, wherein the current measures comprise the first measures, the second measures, the second processed measures, or any combination thereof.

10. The method of claim 9, further comprising the steps of:

prior to the forming step of claim 9, pre-processing the first measures to form first pre-processed measures, wherein the pre-processing comprises one transformation or a plurality of transformations of the first measures, wherein the transformations are selected from the group consisting of a normalization transformation, an impose conditions transformation, an integration transformation, and a combination transformation, pre-processing the second measures to form second pre-processed measures, wherein the pre-processing comprises one transformation or a plurality of transformations of the second measures, wherein the transformations are selected from the group consisting of a normalization transformation, an impose conditions transformation, an integration transformation, and a combination transformation, fusing (a) none, some, or all of the first measures and the first pre-processed measures to form first fused measures, (b) none, some, or all of the second measures and the second pre-processed measures to form second fused measures, or (c) none, some, or all of the first measures, the first pre-processed measures, the second measures and the second pre-processed measures to form mixed fused measures, preforming the remaining steps of claim 9 using none, some, all, or sets of the current measures independently, wherein the second current measures comprise the first measures, the first pre-processed measures, the first fused measures, the second measures, the second pre-processed measures, the second fused measures, or any combination thereof, and fusing none, some or all of the first measures, the first pre-processed measures, the first fused measures, the second measures, the second pre-processed measures, the second fused measures, and/or the measures within each set to form third fused measures.

* * * * *